US012393751B2

(12) United States Patent
Emanuel

(10) Patent No.: US 12,393,751 B2
(45) Date of Patent: Aug. 19, 2025

(54) SYSTEM AND METHOD FOR AUTHENTICATION OF RARENESS OF A DIGITAL ASSET

(71) Applicant: Pastel Growth Fund LLC, Greenwich, CT (US)

(72) Inventor: Jeffrey Emanuel, Brooklyn, NY (US)

(73) Assignee: Pastel Growth Fund LLC, Greenwich, CT (US)

( * ) Notice: Subject to any disclaimer, the term of this patent is extended or adjusted under 35 U.S.C. 154(b) by 392 days.

(21) Appl. No.: 18/160,515

(22) Filed: Jan. 27, 2023

(65) Prior Publication Data

US 2024/0256741 A1    Aug. 1, 2024

(51) Int. Cl.
  *G06F 30/27*    (2020.01)
  *G06T 3/60*    (2024.01)
  *G06V 10/74*    (2022.01)
  *G06V 10/77*    (2022.01)

(52) U.S. Cl.
  CPC .............. *G06F 30/27* (2020.01); *G06T 3/60* (2013.01); *G06V 10/761* (2022.01); *G06V 10/77* (2022.01)

(58) Field of Classification Search
  None
  See application file for complete search history.

(56) References Cited

U.S. PATENT DOCUMENTS 11,966,436 B2 *  4/2024  Hughes ................ G06V 10/761
12,271,696 B1 *  4/2025  Galvin ................. G06F 40/284
12,277,769 B2 *  4/2025  Cheng .................... G06V 40/10
2020/0126209 A1 *  4/2020  Kim ......................... G06N 3/08
2021/0192316 A1   6/2021  Stroetgen et al.
2023/0021661 A1 *  1/2023  Bao ...................... G06V 40/161

(Continued)

FOREIGN PATENT DOCUMENTS

EP  3770840 A1  1/2021
KR  102457034 B1  10/2022

OTHER PUBLICATIONS

Millidge et al., "Universal Hopfield Networks: A General Framework for Single-Shot Associative Memory Models," Proceedings of the 39th International Conference on Machine Learning, PMLR 162:15561-15583, 2022 (Year: 2022).*

(Continued)

*Primary Examiner* — Soo Shin
(74) *Attorney, Agent, or Firm* — Leason Ellis LLP

(57) ABSTRACT

Systems and methods for asset fingerprinting and for authentication of rareness of a digital asset. The solution can be implemented in a peer-to-peer decentralized platform for securely registering, trading, and collecting non-fungible-tokens, which are associated with digital visual artwork and are recorded on a blockchain. The system comprises a Fingerprinting Engine (FE) and Relative Rareness Engine (RRE). The FE processes the digital asset (e.g., NFT image) using trained neural network models, which generate a digital fingerprint vector representation of the image. The RRE compares the digital fingerprint vectors to a dataset of registered digital fingerprint vectors using multiple correlation measures. The correlation results are analyzed and combined to generate a Relative Rareness Score representing the rarity of the NFT. Additionally, the RRE can evaluate rareness of the image relative to images on the Internet.

28 Claims, 12 Drawing Sheets

(56) References Cited

U.S. PATENT DOCUMENTS

2024/0112484 A1* 4/2024 Hallock ............... G06V 30/418
2024/0386015 A1* 11/2024 Crabtree ............. G06F 16/9024

OTHER PUBLICATIONS

Polyxeni Sgouroglou, "Non-biometric Spoofing Detection," Master Thesis, Alpen-Adria-Universität Klagenfurt, Feb. 2019 (Year: 2019).*
Wang, Wenhao, et al. "D^2LV: A Data-Driven and Local-Verification Approach for Image Copy Detection." arXiv preprint arXiv:2111.07090. pp. 1-8. arxiv.org. (2021).
He, Kaiming, et al. "Deep residual learning for image recognition." Proceedings of the IEEE conference on computer vision and pattern recognition. 770-778. 2016.
Ljubovic Vedran et al.: "Plagiarism Detection in Computer Programming Using Feature Extraction From Ultra-Fine-Grained Repositories" IEEE Access, IEEE, USA, col. 8, May 19, 2020 (May 19, 2020), pp. 96505-96514, XP011791267, [retrieved on Jun. 1, 2020].
Mohammadamin Fazli et al. "Under the Skin of Foundation NFT Auctions", arxiv.org, Cornell University Library, 201 Olin Library Cornell University Ithaca, NY 14853, Sep. 25, 2021 (Sep. 25, 2021), XP091058457, Section 4.2-4.3 2024.
International Search Report and Witten Opinion of the International Searching Authorit, Application No. PCT/US2024/013131, mailed May 17, 2024, 26 pages.

* cited by examiner

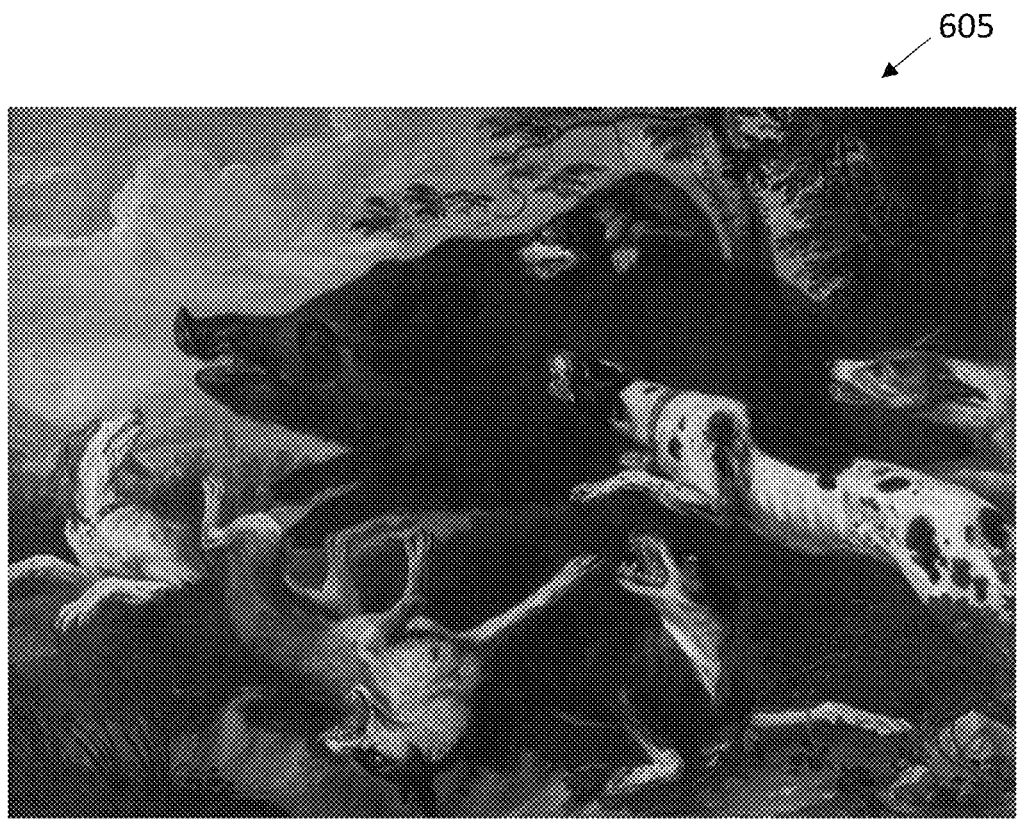
FIG. 6

```
{
"dupe_detection_system_version": "1.0",
"hash_of_candidate_image_file":
"00d201498d114d3ecddc8c3a53e0a50605cfc4f7f00d0b51a035435b93 4
"is_likely_dupe": 0,
"overall_average_rareness_score": 0.9397604155043761,
"is_rare_on_internet": 0,
"matches_found_on_first_page": 3,
"number_of_pages_of_results": 2,
"url_of_first_match_in_page":
"https://www.wga.hu/art/l/le_pautr/jean/vasecart.jpg",
"open_nsfw_score": 0.003387457923963666,
"alternative_nsfw_scores": {"drawings": 0.0073842271231114864,
"hentai": 0.0179757531732320
"image_hashes": {"pdq_hash":
"81d39ce6434f5993850c671d5c93b27cfa3098c3a37c79c95fd2262e68ac
5
"image_fingerprint_of_candidate_image_file": "[0.056579, 0.109756,
0.0, 0.158492, 0.110712
}
```

FIG. 9

*Original Image*

*Generated Duplicate 1*

*Generated Duplicate 2*

SYSTEM AND METHOD FOR
AUTHENTICATION OF RARENESS OF A
DIGITAL ASSET

FIELD OF THE DISCLOSURE

The present disclosure relates to systems and methods for authenticating digital works recorded on a distributed ledger or blockchain. In one particular arrangement, the present disclosure describes a system and method for fingerprinting a digital visual asset and evaluating the rarity of the digital asset associated with a non-fungible token stored on a blockchain.

BACKGROUND OF THE DISCLOSURE

In the case of traditional art objects, such as paintings, drawings, sculptures, and limited-edition prints, a copy is inferior to the original object. As long as it is possible to distinguish authentic works from counterfeits, no rational buyer would pay nearly as much for a copy. But how should one think about a natively digital artwork—an artwork which the creator intended from inception to be presented in a digital format (as opposed to, say, a digital photo of a physical painting)—which is, in a literal sense, a specific series of zeros and ones. Is not every identical list of digits the same in a similar way to how all gold atoms are the same? Put differently, the physical instantiation of a natively digital work of art seems to be fundamentally secondary to its essence; who cares if it is stored on a DVD or a USB flash memory drive? Won't art historians of the future care more about the data itself, which is simply information without physical form?

An analogy is useful in understanding the differing dynamics of natively digital artwork. Imagine two scenarios: in the first, a person possesses of a mint condition original copy of the first Spider-Man comic book. In the second, a person possesses a high-resolution PDF file of that same comic book. While both of these people would be able to read and enjoy the artwork featured in the object, one of them is worth thousands of dollars in the marketplace, while the other would be considered worthless by most. The reason, of course, is that the physical edition is rare. When Spider-Man was first invented, no one knew that it would later take on iconic cultural status: few were made, and of those that were made, most were discarded or eventually lost or destroyed by the children and adults who bought them.

The de-facto exclusivity that goes along with possession of a physical object (i.e., it is in your house, so it cannot also be in anyone else's house at the same time) is thus a critical factor in the value of traditional artworks. While this attribute comes automatically in physical artwork by virtue of the intrinsic qualities of space and matter, it is completely lacking in the digital realm.

The use of blockchain or distributed ledger technology as a registry for digital artwork is one approach to providing some measure of exclusivity in relation to digital artwork. However, no existing project has solved the particular challenges that arise in developing a digital asset registry system that can work reliably and securely in a truly decentralized way.

The advent of non-fungible tokens (NFTs) has increased both awareness and demand for rare digital assets. The term NFT is commonly used to describe blockchain-based cryptographic tokens that are created with respect to a digital asset and stored on a blockchain. An NFT is a cryptographic token, but unlike cryptocurrencies such as bitcoin and many network or utility tokens, which are mutually interchangeable (i.e., fungible), each NFT is verifiably unique (i.e., non-fungible). Commonly, the NFT is stored on a blockchain and metadata included in the token (e.g., a URL) references the corresponding digital asset, which is stored elsewhere. Accordingly, NFTs can be created around a large range of digital assets such as digital artwork, images, video, audio and the like.

While NFTs can provide a public certificate of authenticity or proof of ownership for the token itself, the legal rights conveyed by an NFT can be uncertain. Furthermore, because the NFT typically links to a stored digital file, NFTs alone do not restrict the sharing or copying of the associated digital files, and do not prevent the creation of NFTs with associated digital works that identical or near-duplicates.

NFTs indeed offer certain advantages for both digital asset creators and speculators alike—interoperability across ecosystems increases tradability and liquidity, while token standards like ERC721 promise provable scarcity. However, NFT platforms face certain challenges. For one, no existing NFT platforms offer a system which can provide the network sophistication to detect against near duplicate digital artwork.

Effective near-duplicate image detection is an open research problem in computer vision, given the fact that visual data is extremely high dimensional. Even a relatively tiny 100 kb jpeg file can easily include 500,000 or more pixels, each of which has a red, green, and blue component. Moreover, someone could edit that jpeg file in Photoshop in such a way that the visual appearance would seem immediately recognizable to a human observer as a simple derivative of the original image, but nevertheless end up changing every single one of the pixels, perhaps in complex ways that leave little of the original structure intact at the level of the individual pixels.

It is with respect to these and other considerations that the disclosure herein is presented.

SUMMARY OF THE DISCLOSURE

According to an aspect of the present disclosure, a method for authentication of rareness of a digital asset is disclosed. The method comprises generating a first digital fingerprint of the digital asset by running one or more deep learning models on a first visual appearance of the digital asset. The generated first digital fingerprint is a first vector representing the first visual appearance. Additionally, the one or more deep learning models are trained to process visual appearances of digital assets and generate corresponding first vectors suitable for determining visual appearance similarity. The method also includes the step of evaluating similarity of the first digital fingerprint to a registry of registered digital fingerprints by computing corresponding dot products of the first digital fingerprint with the registered digital fingerprints. Like the first digital fingerprint, the registry of registered digital fingerprints is obtained by running the one or more deep learning models on corresponding visual appearances of registered digital assets. Moreover, the method includes the step of determining corresponding first measures of statistical dependency for the registered digital fingerprints by normalizing the computed dot products to a range having a first end corresponding to no similarity with the first visual appearance and a second end corresponding to identical similarity with the first visual appearance. Furthermore, the method includes the step of selecting a fixed number N of the registered digital fingerprints whose corresponding N normalized dot products are closest to the second end of the normalized range. Additionally, the method includes the step of determining a corresponding N second measures of statistical dependency by applying a population measurement test of deviation from independence to N combinations of the first digital fingerprint with the selected N digital fingerprints. Lastly, the method includes the step of authenticating the rareness of the digital asset using the determined first and second measures of statistical dependency.

According to a further aspect of the present disclosure, an automated system for authentication of rareness of a digital asset is disclosed. The system comprises a processing circuit and a non-transitory storage medium storing a registry of registered digital fingerprints, and machine learning models. Also stored on the storage medium are instructions that, when executed by the processing circuit, configure the processing circuit to generate a first digital fingerprint of the digital asset by running one or more deep learning models of the stored machine learning models on a first visual appearance of the digital asset. In particular, the generated first digital fingerprint is a first vector representing the first visual appearance and the deep learning models are trained to process visual appearances of digital assets and generate corresponding first vectors suitable for determining visual appearance similarity. The instructions further configure the processing circuit to evaluate similarity of the first digital fingerprint to the registered digital fingerprints in the registry by computing corresponding dot products of the first digital fingerprint with the registered digital fingerprints. The registry of registered digital fingerprints is obtained by running the deep learning models on corresponding visual appearances of registered digital assets.

The instructions further configure the processing circuit to determine corresponding first measures of statistical dependency for the registered digital fingerprints by normalizing the computed dot products to a range having a first end corresponding to no similarity with the first visual appearance and a second end corresponding to identical similarity with the first visual appearance. Additionally, the instructions configure the processing circuit to select a fixed number N of the registered digital fingerprints whose corresponding N normalized dot products are closest to the second end of the normalized range and determine a corresponding N second measures of statistical dependency by applying a population measurement test of deviation from independence to N combinations of the first digital fingerprint with the selected N digital fingerprints. Moreover, the instructions further configure the processing circuit to authenticate the rareness of the digital asset using the determined first and second measures of statistical dependency.

According to a further aspect, a non-transitory computer readable medium (CRM) having computer instructions stored therein that, when executed by a processing circuit, cause the processing circuit to carry out an automated process for authentication of rareness of a digital asset. The process comprises generating a first digital fingerprint of the digital asset by running one or more deep learning models on a first visual appearance of the digital asset. The generated first digital fingerprint is a first vector representing the first visual appearance. Additionally, the one or more deep learning models are trained to process visual appearances of digital assets and generate corresponding first vectors suitable for determining visual appearance similarity. The process also includes the step of evaluating similarity of the first digital fingerprint to a registry of registered digital fingerprints by computing corresponding dot products of the first digital fingerprint with the registered digital fingerprints. Like the first digital fingerprint, the registry of registered digital fingerprints is obtained by running the one or more deep learning models on corresponding visual appearances of registered digital assets. Moreover, the process includes the step of determining corresponding first measures of statistical dependency for the registered digital fingerprints by normalizing the computed dot products to a range having a first end corresponding to no similarity with the first visual appearance and a second end corresponding to identical similarity with the first visual appearance. Furthermore, the process includes the step of selecting a fixed number N of the registered digital fingerprints whose corresponding N normalized dot products are closest to the second end of the normalized range. Additionally, the process includes the step of determining a corresponding N second measures of statistical dependency by applying a population measurement test of deviation from independence to N combinations of the first digital fingerprint with the selected N digital fingerprints. Lastly, the process includes the step of authenticating the rareness of the digital asset using the determined first and second measures of statistical dependency.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of one or more illustrative embodiments encompassed by the disclosure.

FIG. 6 illustrates an image and a transformed version of the image according to principles of the disclosure;

FIG. 9 includes the text of an exemplary output file generated according to principles of the disclosure;

It is noted that the drawings are illustrative and not necessarily to scale, and that the same or similar features have the same or similar reference numerals throughout.

DESCRIPTION OF CERTAIN EMBODIMENTS OF THE DISCLOSURE

Figure 1A:
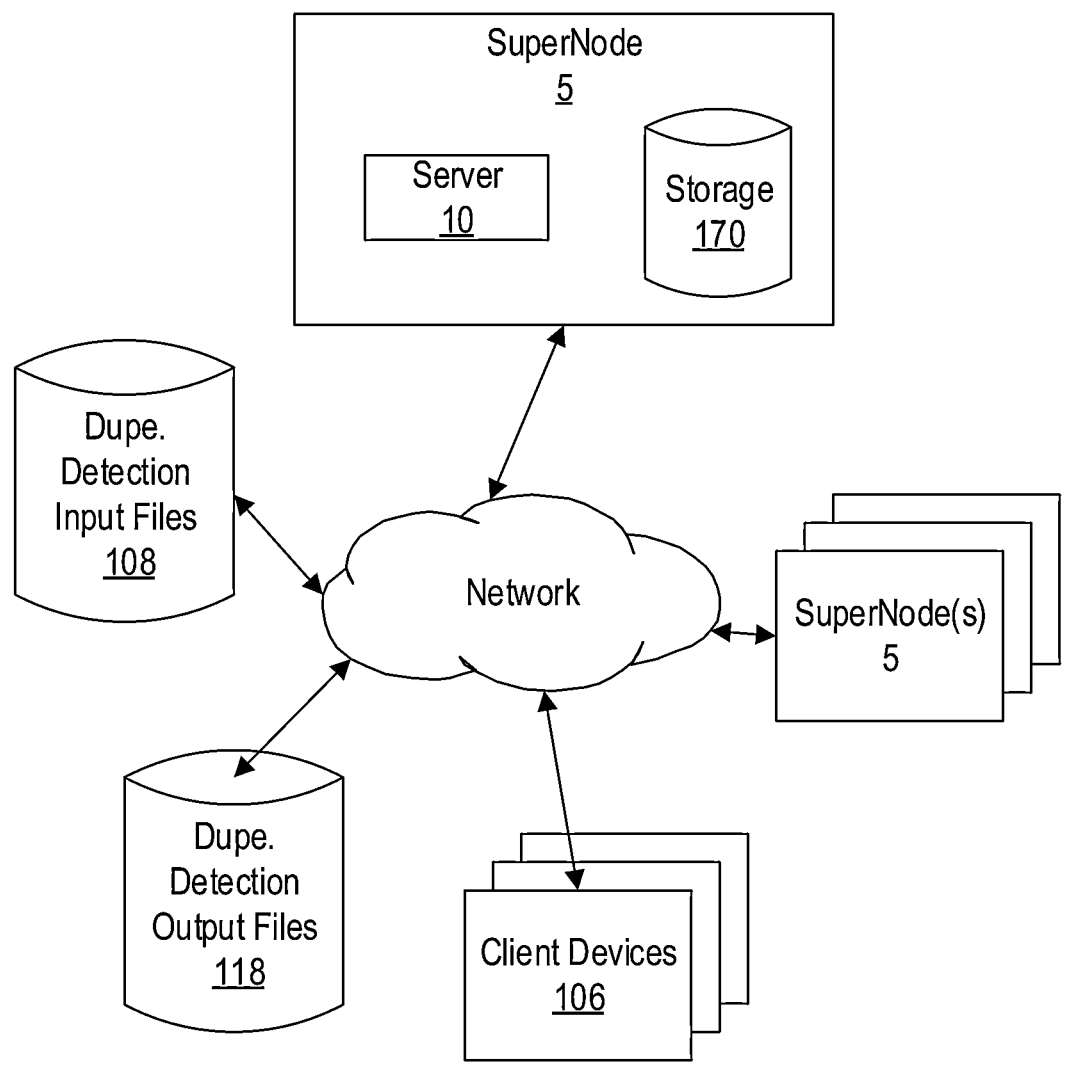
FIG. 1A shows an example of a computer network environment provided with a system for fingerprinting a digital asset and authentication of the rareness of the digital asset, according to principles of the disclosure.

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted for ease of description. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

By way of overview and introduction, the present application describes a system and method for digital asset fingerprinting and rareness evaluation. In a non-limiting embodiment, the systems and methods are described herein in relation to a type of digital asset, namely, digital visual works having corresponding visual appearances (e.g., digital images, artwork, and the like) that are associated with NFTs. It should, however, be understood that the principles of the disclosure are not limited to these exemplary digital asset types. Additionally, it should be understood that the term NFT, as used herein, is intended to refer to the digital asset associated with a non-fungible token stored on a blockchain. It should be further understood that the terms NFT, image, digital asset and visual appearance are used interchangeably herein, with their actual meaning apparent from context.

In one exemplary practical application, the system and method for digital asset fingerprinting and rareness evaluation can be implemented in a digital art registry and marketplace platform such as the Pastel Network, which is a peer-to-peer decentralized platform to securely register, trade, and collect NFTs. As can be appreciated, it can be preferable for a digital art registry or marketplace to allow only sufficiently original works to be registered on the network or at least assign a rareness score that users can consider in their purchase decisions. That is, it can be preferable to identify whether an image is a near-duplicate of another image that has been previously registered on the network to, for example, either prevent registration of near-duplicates or otherwise quantify the rareness/scarcity of a digital asset. Accordingly, the system and method for digital asset fingerprinting and rareness evaluation can be configured to implement a secure cryptographic digital signature scheme and a robust near-duplicate image detection scheme (e.g., detects similarities notwithstanding a large array of potential transformations to the original image, and does not generate excessive false negatives or false positives, i.e., the area under the precision-recall curve is high), thereby offering the digital asset collector a high degree of certainty in determining the rarity, authenticity, and provenance of a specific artwork registered in the system.

If the only concern were detecting an exact bit-for-bit duplicate of an original image file, the system could simply use a file hash, and determine that files with different hashes are unique. However, a file hash is brittle, as changing only a single pixel of an existing registered image would cause the entire hash to change. Accordingly, the system and method for digital asset fingerprinting and rareness evaluation is configured to generate a robust image fingerprint—one that is stable in the face of superficial changes. Put another way, the system and method for digital asset fingerprinting and rareness evaluation is configured to generate a digital fingerprint that identifies or characterizes the image (and corresponding visual appearance) and is robust to various transformations to the original image that, for example and without limitation, can include: cropping, scaling, or rotating the image, adjusting the color, contrast, brightness, or curves of the image, adding random noise or dots to the image, applying any sort of image filter, such as those included in the Adobe Photoshop software package (e.g., blur/sharpen, edge-detection, inverted images, non-linear image warping filters such as Spherize or Twist, and the like).

While near-duplicate image detection is an open research problem in computer vision, prior solutions have been ineffective given the fact that visual data is extremely high dimensional. Even a relatively tiny 100 kb jpeg file can easily include 500,000 or more pixels, each of which has a red, green, and blue component. Additionally, a jpeg file can easily be edited in photo-editing software in such a way that the visual appearance is immediately recognizable to a human observer as a simple derivative of the original image, but nevertheless changes every single pixel, perhaps in highly complex ways leaving little of the original structure intact at the level of the individual pixels, thereby making it difficult for existing near-duplicate image detection technologies to identify the edited image as a near-duplicate of the original. As further described herein, the system and method for digital asset fingerprinting and rareness evaluation can be configured to react similarly to the way a human observer could in determining if two images are related; that is, where an average person could reliably determine that a given image's visual appearance is excessively derivative of an existing registered image, the automated system can reliably reach the same conclusion. Preferably, the system would reject a high percentage of true duplicate works while allowing through the vast bulk of truly original works. The greatest challenge are those artworks on the boundary line—similar to an existing artwork, but different enough that they are not clearly duplicates according to chosen criteria.

Accordingly, to address these and other challenges and objectives, the system and method for digital asset fingerprinting and rareness evaluation incorporate an innovative fingerprinting and near-duplicate detection framework, which leverages advances in machine learning technology as well as unique applications of classical statistical techniques, as further described herein.

In an embodiment, the system for digital asset fingerprinting and rareness evaluation includes a Fingerprinting Engine (FE) component, which is configured to generate a digital fingerprint for digital assets, and a Relative Rareness Engine (RRE) component, which is directed to evaluating the relative rareness of each digital fingerprint within a dataset. Generating the fingerprint for an NFT involves generating a compressed representation of the NFT in a manner that dramatically reduces the dimensions involved, while still retaining the high-level structural content of the input image data. The compressed representation becomes the digital fingerprint, a list of numbers versus the original pixel data, which is robust to various transformations. The Relative Rareness Engine for evaluating rareness is configured to compare the digital fingerprint to digital fingerprints in an underlying data set (e.g., a registry), quantify how rare an NFT is relative to all NFTs in the underlying dataset, and generate a Relative Rareness Score representing the uniqueness/rarity (and thus a measure of similarity) of the NFT.

In this manner, even if the fingerprint of the original NFT is compared to a candidate NFT, which is simply the known NFT transformed, say, with random noise, it will look suspiciously similar to the fingerprint of the original NFT. By quantifying this similarity, the system and method for digital asset fingerprinting and rareness evaluation can generate a measure that is useable as a relative known rareness score. In an embodiment, this score is a number between 0% (i.e., the NFT is identical to an existing NFT) to 100% (i.e., the NFT is not even similar to any known NFT).

The system and method for digital asset fingerprinting and rareness evaluation are capable of recognizing even the most subtle similarities between two digital assets, even if one has been transformed. The protocol goes beyond other digital fingerprint approaches to establishing the rareness of an NFT, by, inter alia, evaluating the rareness of the pixel patterns in data.

Overall System Architecture

FIG. 1A shows a non-limiting example of a computer network environment 1 provided with a technological solution for digital asset fingerprinting and rareness evaluation according to principles of the disclosure. In particular, FIG. 1A illustrates the exemplary architecture of the aforementioned Pastel Network environment 1, which is a peer-to-peer decentralized platform to securely register, trade, and collect NFTs. As shown in FIG. 1A, the computer network environment 1 includes a SuperNode 5 having a server 10 configured to implement the technological solution for digital asset fingerprinting and rareness evaluation. In particular, the server 10 can include a processor 100 (shown in FIG. 1B) including, among other things, the Fingerprinting Engine 150 and Relative Rareness Engine 155.

Figure 1B:
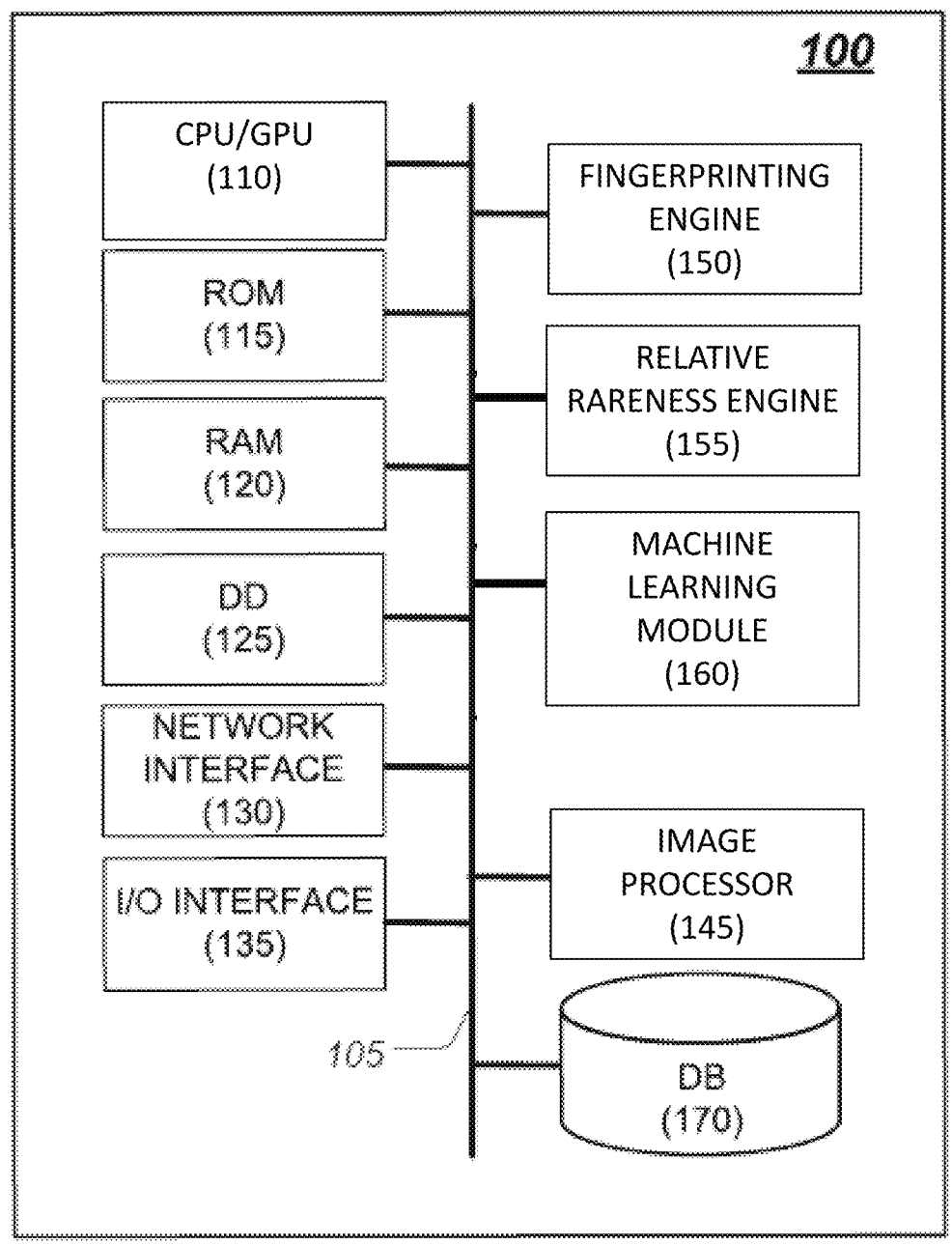
FIG. 1B is a conceptual block diagram showing an example configuration of a processor used in the system of FIG. 1A according to principles of the disclosure.

FIG. 1B shows a non-limiting embodiment of the processor 100 that can be included in the server 10 (shown in FIG. 1A). Although an exemplary configuration of the processor components is discussed in greater detail below, in pertinent part, the processor 100 can include a computer processor 110 such as a computer processing unit (CPU) and one or more modules including the aforementioned Fingerprinting Engine 150 and Relative Rareness Engine 155, a Machine Learning Module 160, and Image Processor Module 145.

Fingerprinting Engine

Figure 2:
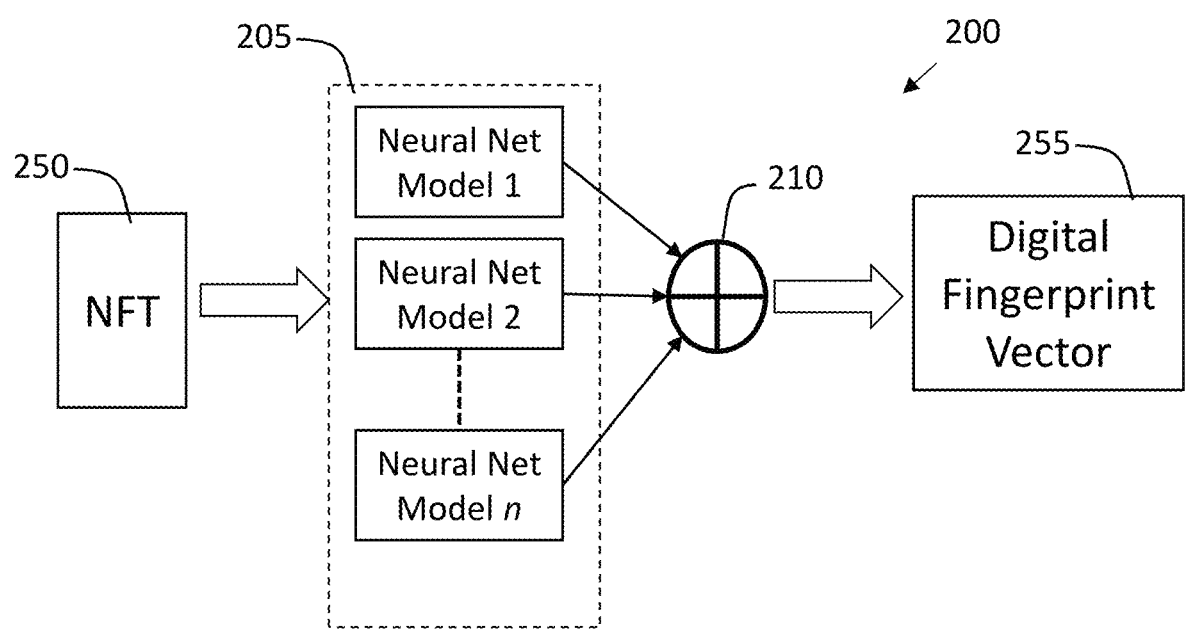
FIG. 2 is a process flow diagram illustrating an exemplary routine for generating a digital fingerprint vector according to principles of the disclosure.

FIG. 2 is a hybrid system and process flow diagram illustrating a method 200 for fingerprinting an NFT according to principles of the disclosure. One or more steps of the routine 200 can be performed using the processor 100, and more particularly the Fingerprinting Engine 150.

In an embodiment, the Fingerprinting Engine is configured to leverage a variety of well-trained deep neural net models and, in doing so, can achieve exceptional results on complex data classification tasks. More specifically, at step 205, each model is passed image data concerning a given NFT 250. Each model is configured to generate a list of N numbers in a particular order, which is referred to as the respective digital fingerprint vector for a given image and model, that characterizes the contents of the image.

An analogy of how a neural network model generates a vector is as follows: scan the brain of a human subject in real-time to determine exactly what nerve cells are active at any time, and how activated each one is; then show the human subject the candidate image and record the results of the activation pattern in their brain as a series of numbers. Similar to how a human brain works, a deep neural net models can include tens of millions of artificial neurons, and what a given neural net model sees (i.e., the vector "embedding" it generates as a function of its programming and training) is not simply a mechanical description of the precise pixels, but rather a high-level depiction of the features of the image. The neural net model's ability to generate a representation of the high-level abstract content of the image makes the output representations powerful for purposes of characterizing distinctive features of the image and thus evaluating the relative rarity of the image.

In an embodiment, in order to construct the digital fingerprint vector, the Fingerprinting Engine is configured to utilize a plurality of well-defined neural net models, for instance, four neural net models. Each model can require a unique pre-processing pipeline applied to the image. The pre-processing pipeline can include various image processing operations performed on the image, for example, resizing and pixel representation.

The Fingerprinting Engine is then configured to obtain the respective fingerprint vector output from each of the models, respectively, and combine the respective fingerprint vectors at step 210 to generate a composite digital fingerprint vector 255.

In an embodiment, the respective fingerprint vectors are concatenated to define the composite digital fingerprint vector. For instance, the single digital fingerprint vector can consist of exactly 10,048 decimal numbers. However, longer or shorter fingerprint vectors can be used depending on the application.

In view of the foregoing, it can be appreciated that the Fingerprint Engine implementing the digital asset fingerprinting method 200 effectively translates input data into a unique digital fingerprint vector for a given image, which is a compressed representation of the image that dramatically reduces the dimensions involved while still retaining the high-level structural content of the image data. Moreover, testing has shown that this fingerprinting process can take less than a few seconds to complete.

Relative Rareness Engine

The Relative Rareness Engine (RRE) leverages the digital fingerprint vector, which serves as a representation of the NFT image data, to assess the relative rareness of each digital fingerprint more accurately within the dataset over conventional techniques.

Figure 3:
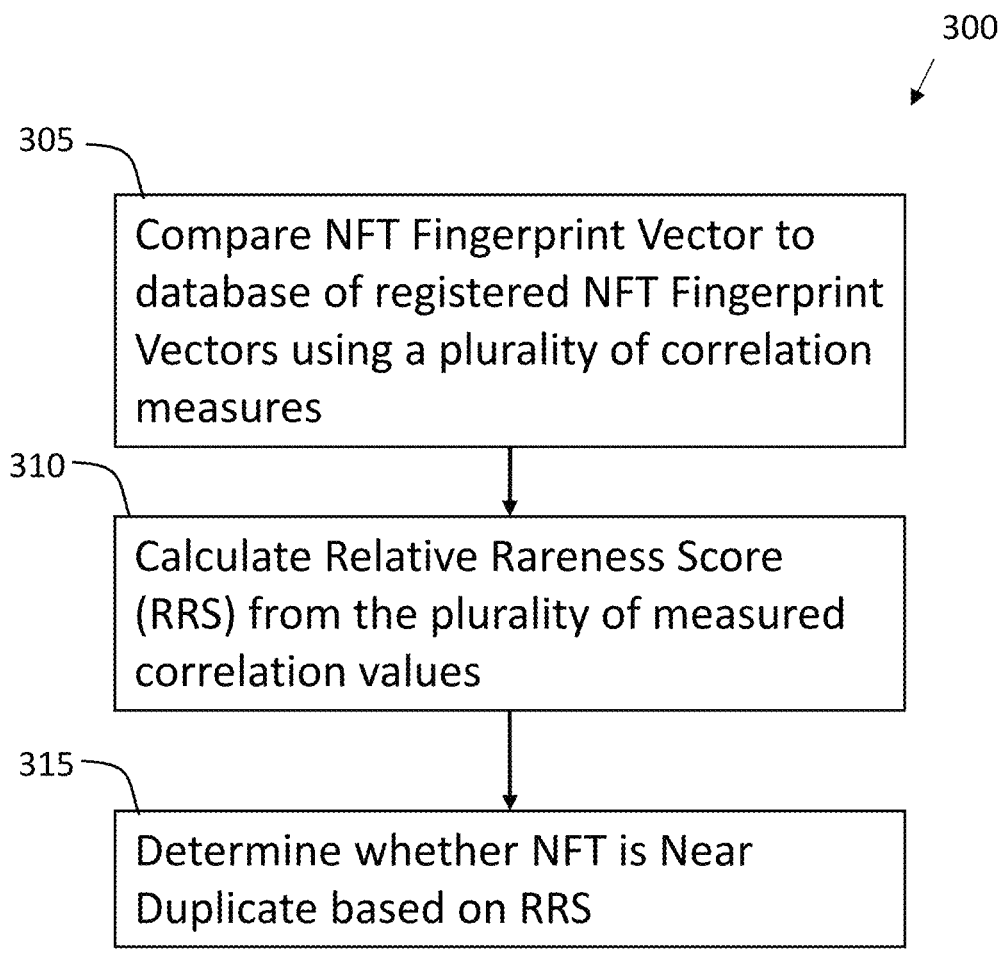
FIG. 3 is a process flow diagram illustrating an exemplary routine for evaluating a relative rareness of an NFT according to principles of the disclosure.

FIG. 3 is a process flow diagram illustrating a method 300 for computing a Relative Rareness Score (RRS) of a digital fingerprint relative to a dataset of digital fingerprints according to principles of the disclosure. One or more steps of the routine 300 can be performed using the processor 100, and more particularly the Relative Rareness Engine 155.

At step 305, the RRE 155 compares the digital fingerprint vector to the digital fingerprint vectors for previously registered NFTs in the database. As a result of the comparison, the RRE computes a relative rareness score at step 310. In an embodiment, this score is a number between 0% (i.e., the NFT is identical to an existing NFT) to 100% (i.e., the NFT is not even similar to any known NFT). At step 315, the RRE determines whether the NFT is a near duplicate to a previously registered NFT based on the RRS.

By virtue of the solution for generating the digital fingerprint vectors, digital fingerprint vectors are robust to simple transformation and are describing similarity that looks into the fingerprints at a deeper level.

In an embodiment, the RRE is configured to leverage different correlation measures and statistical dependency measures to measure the rareness of a given digital fingerprint relative to the database of digital fingerprints (e.g., database 170) and generate the RRS. In particular, at step 305, the RRE can be configured to compare a candidate digital fingerprint vector to the digital fingerprint vectors of all previously registered NFTs in the system using each of a plurality of different correlation measures. For each correlation measure, a respective correlation value can be computed, and a list of correlation values can be output by the RRE. From the respective correlation values, the RRE can further compute the RRS, at step 310. Testing has revealed that the RRE can compute the correlation between a candidate digital fingerprint and the entire database of many hundreds of thousands or millions of NFTs in as little as a few seconds.

To reliably calculate the RRS and identify near-duplicate NFTs with a reasonable confidence interval, the RRE is configured to leverage a variety of functions and correlation measures—some of which are fairly advanced and computationally intensive. For example and without limitation, the various correlation measures can include, Pearson's R correlation, Spearman's Rho correlation, Kendall's Tau correlation, Hoeffding's D dependence, Mutual information, Hilbert Schmidt Independence, and XG Boost Feature Importance. For example, the RRE is configured to rely on correlation measures that operate on the ranks of data rather than the data values themselves, and on similarity measures of statistical dependency. Essentially, these measures inform the RRE about how suspiciously similar two fingerprint vectors are. Put another way, they enable the RRE to measure how improbable it would be to find such particular patterns between the fingerprints if it were really looking at random or unrelated data.

The RRE is configured to employ several differentiated, varied, and powerful similarity measures to measure relative rareness more accurately and combat the issue of false negative and false positive near-duplicate detection results.

Optimization Techniques

The RRE can be configured to employ additional techniques to further optimize the performance of the system and minimize false negative and false positive near-duplicate detection results.

In an embodiment, the RRE is configured to assess all Pearson correlation scores for all registered NFTs versus the candidate NFT, and then compare the value of the maximum correlation of any registered NFT to the 99.99th percentile correlation across all registered NFTs. The percentage increase in the maximum correlation versus the 99.99th correlation (i.e., Pearson Gain), can provide some useful information if it is large enough. For example, suppose that there are 10,000 registered fingerprints such that there are 10,000 correlation scores, sorted in descending order. The RRE is configured to compare the maximum to the 99.99th percentile score—suppose that the top score is 86.00%, and the second score is 65.00%, implying a Pearson Gain of 86.00%/65.00%−1=32.3%. This signifies that exactly one had a much higher correlation than the rest of the dataset. Extending this across the entire dataset, the RRE can identify correlation across broad clusters of NFT data objects. Implementing this requirement can drastically improve the threshold of confidence in the system.

In an embodiment, the RRE is configured to accurately quantify a similarity score on a spectrum of 0.00%-100.00%, rather than a binary 0-1, in a way that resembles human intuition. The RRE can be configured to combine the results of the processes described above to generate various sub-scores that can be transformed to a single number between 0.00%-100.00%. One sub-score sums up the various similarity measures and compares the sum to the maximum if the NFTs were the same, essentially averaging the result of the different similarity measures to the extent they are available. The RRE is further configured to combine the sub-scores across each methodology to compute the combined Relative Rareness Score.

Machine Learning

The solution for digital asset fingerprinting and rareness evaluation can be further configured to employ a parallel approach using machine learning to further optimize the systems and methods for computing the RRS and detecting near-duplicate images.

In an embodiment, the processor 100 includes a Machine Learning Module 160 including one or more supervised machine learning system and/or one or more unsupervised machine learning systems. The Machine Learning Module can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), a region-based convolutional neural network (R-CNN), a you-only-look-once (YOLO) approach, a Mask-R-CNN, a deep convolutional encoder-decoder (DCED), a recurrent neural network (RNN), a neural Turing machine (NTM), a differential neural computer (DNC), a support vector machine (SVM), a deep learning neural network (DLNN), a naïve Bayes, a decision tree, a logistic model tree induction (LMT), an NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning.

Figure 4:
FIG. 4 illustrates three sets of images including base images and multiple transformations of the base images according to principles of the disclosure.

In an embodiment, the processor 100 can access a universe of known NFT files, for instance, by accessing open data from OpenSea, which is a platform for creating and selling/buying NFTs. Additionally, the processor can segregate a certain percentage of the data to define a subset of registered NFTs, and compute their digital fingerprint vectors, which are stored in a database 170 of registered NFTs. The remaining NFT files in the dataset are segregated into a subset of unknown true original NFTs—that is, their digital fingerprint vectors are not computed and it is known that none of this subset of NFTs is in the database. Finally, the processor 100 can be configured to generate a large corpus of artificially generated near-duplicate NFTs through transformation techniques applied to the NFTs in the subset of registered NFTs, as shown and described in the examples discussed below. For example, FIG. 4 depicts three sets of images 405, 410, 415 that each include an original image (leftmost image) and near-duplicate NFTs (remaining images) generated through various transformation techniques.

Then, the processor 100 can be configured apply the digital asset fingerprinting and rareness evaluation protocols to the transformations, which can be stored in the database 170, for example. Specifically, a known near-duplicate NFT is selected from the corpus of artificially generated near-duplicate NFTs, its digital fingerprint vector is computed (e.g., according to method 200). Additionally, a funnel of correlation measures are applied to compare the digital fingerprint vector to all registered NFTs in the database (e.g., according to method 300). Next, an original NFT is selected from the subset (it being known that the selected original NFT should not be identified as a near-duplicate of any registered NFT in the database) and the same fingerprinting and rareness evaluation routines are applied to the original NFT. For each of these, the processor is configured to observe how many registered fingerprints make it to the last stage of the funnel. Rather than track the Combined Relative Rareness Score, the processor can apply a binary label of 1 to the artificial near-duplicate NFTs and 0 to the true originals. The processor can then model the input data against the various similarity measures and sub-scores computed for each image.

This methodology enables the processor 100, and more particularly the Machine Learning Module 160 (FIG. 1B), to then make use of machine learning training, or supervised learning to generate a predictive model for determining whether an NFT is a duplicate or original. More specifically, given a row of data which signifies the maximum correlation scores of a candidate NFT versus all the registered digital fingerprints, the predictive model is configured to predict whether the label is a 1 (i.e., duplicate) or a 0 (i.e., original) using various approaches. In an embodiment, the predictive model can include a trained random forest classifier configured to use an ensemble of decision trees to predict the label from the input data via XGBoost. In an embodiment, the predictive model can include a deep neural network classifier constructed using Keras applications and configured to predict the label from the input data. Each of the models are nuanced and provide different degrees of gradations. Accordingly, the system can combine each score to produce a final Overall Average Score, which is more precise and maps closer to human intuition than any individual score.

Example Image Transformations

The following discussion describes exemplary techniques the processor 100 can be configured to implement for generating near-duplicate images and corresponding results from the system and method for digital asset fingerprinting and rareness evaluation running on example NFTs from the test corpus of near-duplicate NFTs artificially generated through respective transformation techniques.

Figure 5:
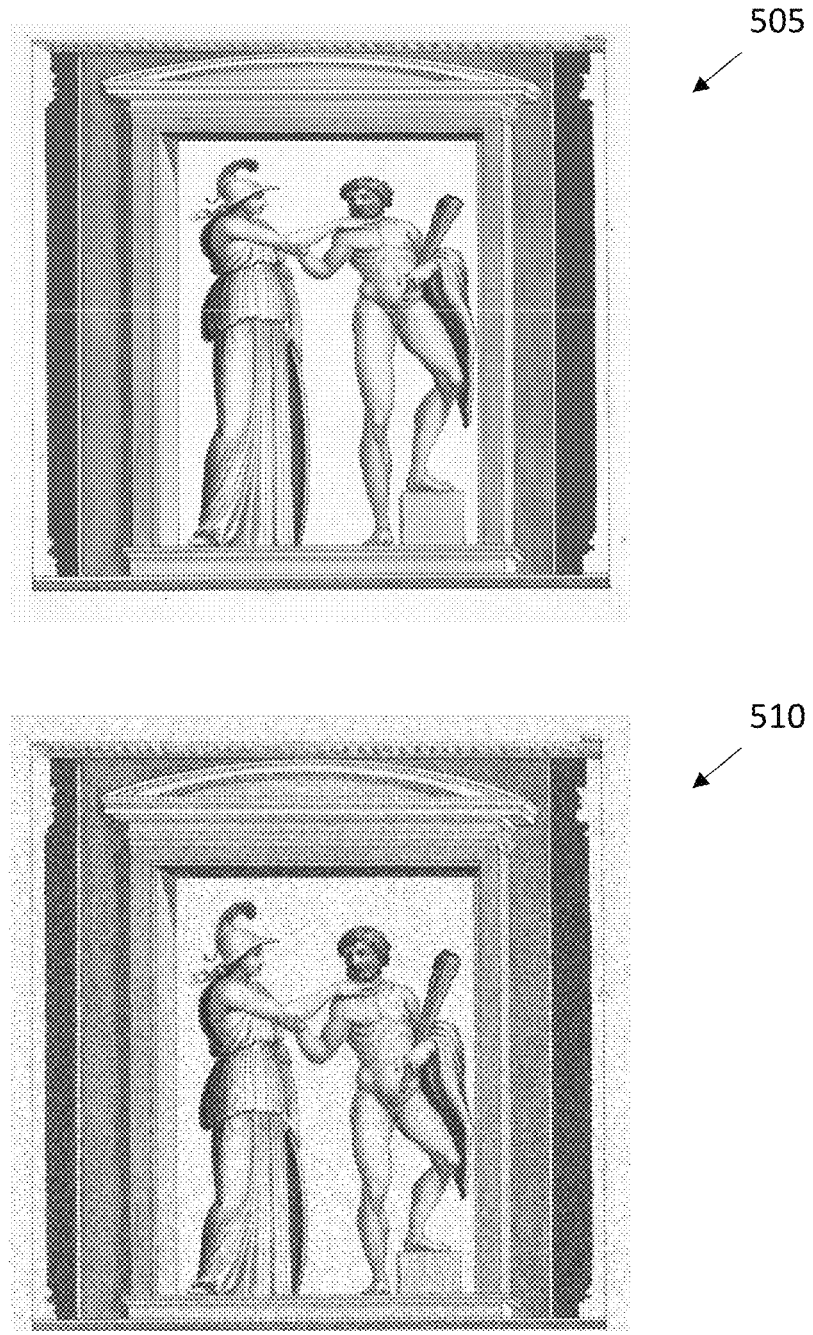
FIG. 5 illustrates an image and a transformed version of the image according to principles of the disclosure.

In an embodiment, the processor 100 can be configured to create near-duplicate NFTs by modifying a known NFT by adding random noise. Preferably noise is added to an extent that is more than enough to cause conventional image matching solutions, such as Google's reverse image search, to not find any matches at all. For example, FIG. 5 depicts two images, an original NFT image 505 and a modified version of the image 510 modified according to the foregoing techniques. In testing, the system classifies the image 510 as a near-duplicate, assigning it a fairly low overall average rareness score of ~28.82%. The system was also able to correctly identify the exact registered image that the candidate image was derived from.

By way of further example, a near-duplicate can be generated by stretching a registered image. For instance, FIG. 6 depicts two images, an original NFT image 605 and a modified version of the image 610 modified by stretching. In testing, the system classifies the modified image 610 as a near-duplicate, assigning it a rareness score of ~0.087, which is quite low given that an identical image would produce a score closer to 0.0.

Figure 7:
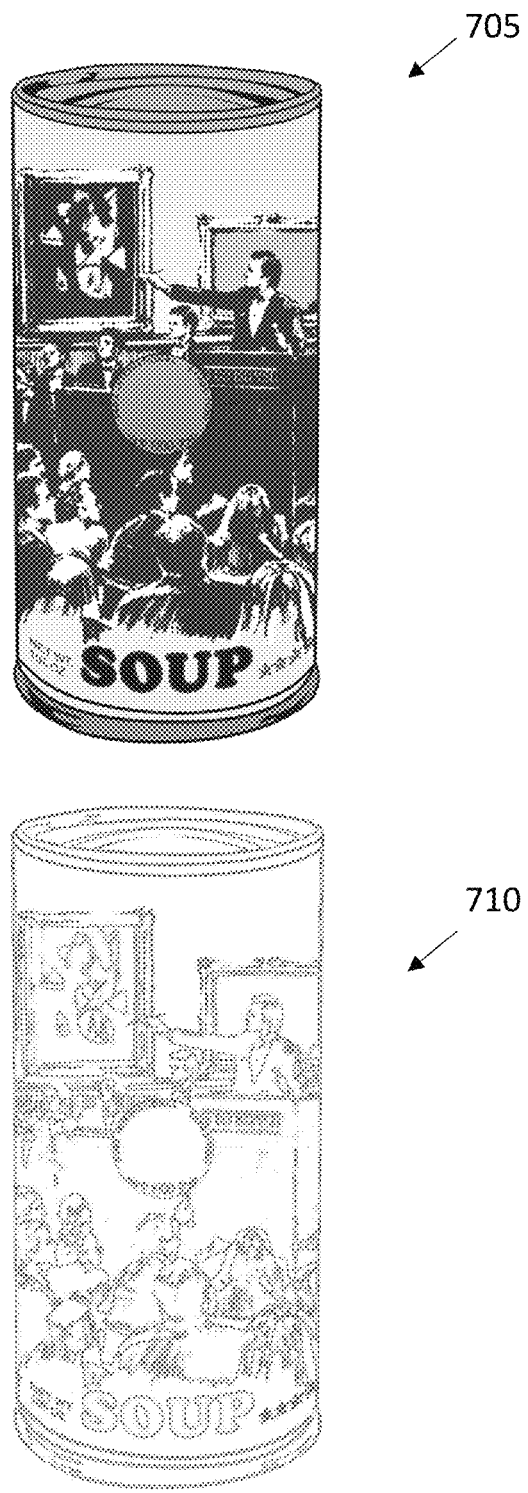
FIG. 7 illustrates an image and a transformed version of the image according to principles of the disclosure.

By way of further example, a near-duplicate can be generated by applying a contour or edge detection filter on a registered image. For instance, FIG. 7 depicts two images, an original NFT image 705 and a modified version of the image 710 modified by applying a contour or edge detection filter. In testing, the system classifies the modified image 710 as a near-duplicate, assigning it an overall average rareness score of just ~0.15, despite it looking dramatically different versus the original.

Rareness on the Internet

Figure 8A:
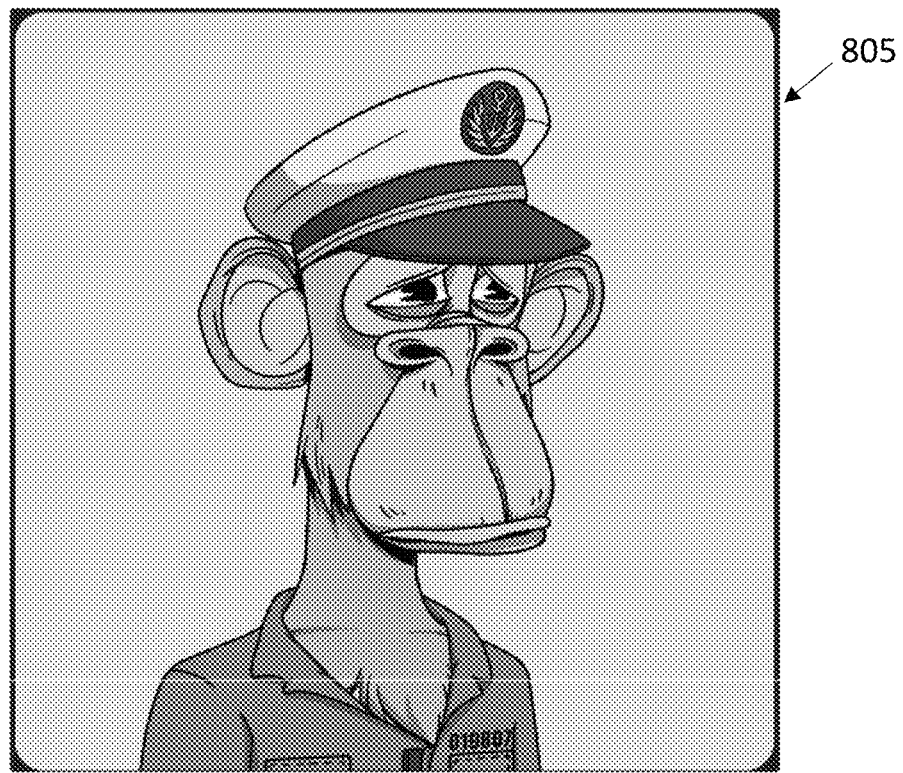
FIG. 8A depicts an exemplary image.
Figure 8B:
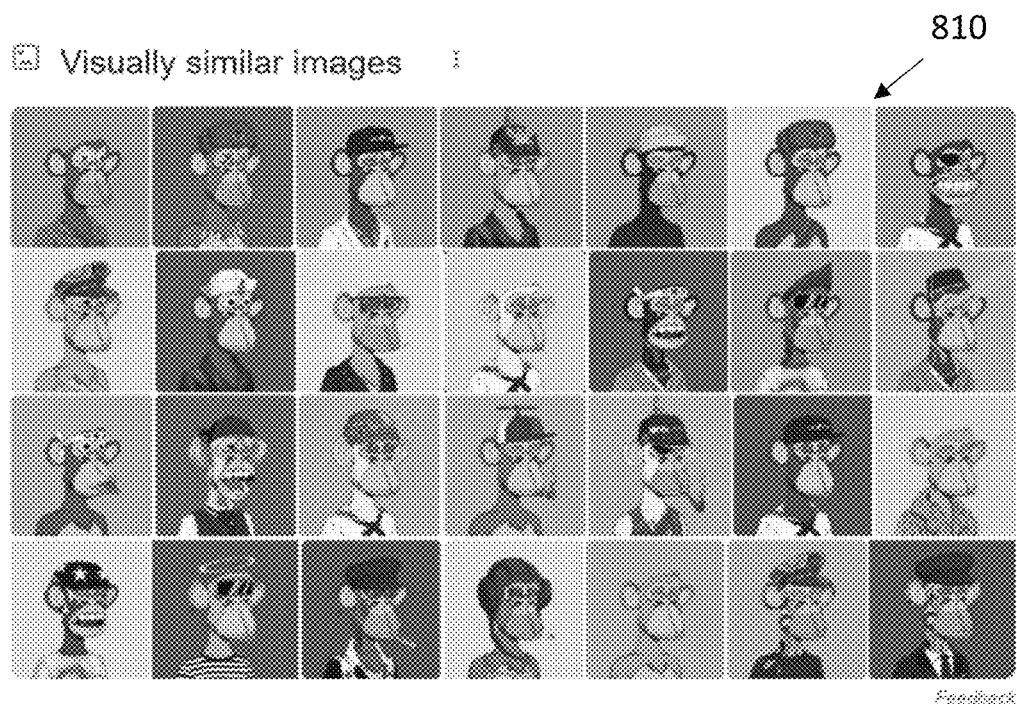
FIG. 8B depicts a set of images that are visually similar to the image of FIG. 8A according to principles of the disclosure.

In an embodiment, the processor 100 can be further configured to leverage existing open-source functionality, such as Google's Reverse Image Search, to crawl and index websites and assess rareness of an NFT relative to what is known to the Internet. For instance, in response to a user attempt to register an NFT, say, the image 805 shown in FIG. 8A, the processor 100 can be configured to submit the NFT to such a reverse image searching tool, which can return results described as visually similar data. For instance, based on the image 805, the reverse image searching tool can return a set of visually similar images 810 on the Internet shown in FIG. 8B. The images shown in 810 have been indexed by various websites and the reverse image search tool is able to find the exact image. The same applies to an NFT series where there are dozens or even thousands of extremely similar images created as part of a series of collectible NFTs.

Accordingly, when a user attempts to register an NFT within the Pastel Network environment 1, in addition to determining rareness and near-duplicate detection relative to digital assets previously registered within the network as described above, the processor 100 can be further configured to assess the NFT's rareness relative to the Internet. In an embodiment, the rareness of an NFT with respect to the Internet can be performed by nodes within the network environment 1 in a fully decentralized way. In particular, multiple randomly selected SuperNodes 5, each including a server 10 and processor 100, can be configured to conduct the same search and ensuring that their results all match exactly (e.g., just as the RRS score relative to registered NFTs can be computed by multiple SuperNodes independently and the results checked for consistency).

If an artist has created a genuinely new image and never shared this image before online, then they can first register it within the Pastel Network environment 1. The processor 100 can assign a highest level of certified rareness available on the system, as the resulting NFT will be rare within the Pastel Network environment 1 and rare on the Internet. Additionally, both of these rareness metrics can be written into the immutable NFT registration ticket that is recorded as part of the Pastel Blockchain (not shown). If that image is subsequently shared on social media or other websites, then the rareness scores of the NFT will not change—the matter of primary importance is how rare the image was at the time the NFT was registered on Pastel.

As can be appreciated, the exemplary network environment 1 implementing the systems and methods for digital asset fingerprinting and rareness evaluation facilitate a much stronger concept of what it means for a digital image to be rare. Not only can the solution verify the authenticity and provenance using the creator's digital signatures (like all NFT systems in use), but it can go much further, and actually assess how rare the underlying pixel patterns of the image are, both on Pastel Network environment 1 itself as well as on the broader Internet. As value is largely a function of rareness/scarcity, the additional layer of authentication of rareness provided by the exemplary solution can provide better valuations for NFT creators. After all, even if another creator makes a similar NFT in the future, they can still be able to register it on the Pastel Network 1, but it will not be assigned anything close to the rareness score of the original image.

Furthermore, even if the original creator themselves try to create another similar or identical NFT in the future, this subsequent NFT will not have the rareness score of the creator's first and original NFT. This protects NFT buyers from inflation caused by the creator, which is something that an NFT system based only on verifying digital signatures cannot accomplish, since the second or third highly similar or identical NFT would still appear to be legitimate because the artist correctly signed it-despite the fact that it is a knock off of the original.

Coordinated Operation of SuperNodes

In an embodiment, and as shown in FIG. 1A, the Pastel Network environment 1 includes a plurality of SuperNodes 5 from which multiple pastel SuperNodes can be randomly selected to respectively calculate an RRS for an NFT and/or evaluate rareness with respect to the Internet, and the respective results can be compared for consistency. The coordinated and distributed configuration of the SuperNodes can provide redundancy, reliability and scalability.

More specifically, in an embodiment, each SuperNode 5 is provided with a handful of support directories to exist on the local machine. The database 170 of digital fingerprints (which can use SQLite as the database system, for example) file is seeded with several thousand digital fingerprints. In addition, there are pre-trained classifiers such as XGBoost and Keras that are downloaded and trained by the respective processor 100.

The processor of each SuperNode runs a software process (e.g., a Python file), which configures the processor to loop and monitor a duplicate-detection-input-files folder 108 for new NFT files. Although input file folder 108 (and output file folder 118) are shown in FIG. 1 as a stand-alone file repository that is accessible by multiple SuperNodes 5, such folders can be provided locally to respective SuperNodes. If new data from a user (e.g., using client device 106) is uploaded into this folder, the processor is configured (e.g., by code) to wait for the file to finish uploading over and will then proceed with the analysis automatically. More specifically, first it will compute the RRS for the NFT, and then it will compute the Internet rareness score.

Additionally, the processor can be configured (such as by code) to compute a series of perceptual hashes. The perceptual hashes are used to scale the system in the case when a candidate NFT is a near exact duplicate of an already registered NFT. In effect, if the hash-based system uncovers a duplicate, the processor can skip over the computationally intensive processes and go straight to assigning the image a rareness score of zero. In this regard, the processor can be configured to use a variety of image hashing algorithms, including for example, and without limitation, the pdq algorithm from Facebook Research and the NeuralHash algorithm from Apple, as well as other traditional methods.

Upon completion of the foregoing process the processor can be configured (e.g., programmed) to generate a json file that is output to a folder, e.g., the duplicate-detection-output-files folder 118. In an embodiment, the file name is the first 10 characters of the SHA3-256 hash of the image file, for example 00d201498d.json. The contents of this file can include various information concerning the NFT and salient metrics generated by the system. FIG. 9 illustrates the text content 905 of an exemplary output file, which includes the hash of the candidate input file "hash_of_candidate_image_file", the duplicate detection result ("is_likely_dupe": 0), an average rareness score value ("overall_average_rareness_score"), an Internet rareness score value ("is_rare_on_internet"), the number of matches found on the first page of the Internet search results ("matches_found_on_first_page": 3), the number of pages returned by the Internet search results ("number_of_pages_of_results": 2), a URL of the first match in the Internet search, ("url_of_first_match_in_page"), score values representing whether the image includes explicit material ("open_nsfw_score" and "alternative_nsfw_scores"), a hash of the image ("image_hashes"), and the digital fingerprint generated for the candidate image file("image_fingerprint_of_candidate_image_file," which has been shortened for brevity).

The aforementioned architecture of the exemplary Pastel computer network environment 1 provided with the technological solution for digital asset fingerprinting and rareness evaluation can scale up to several hundred thousand images or more. In an embodiment, the machine running the duplicate detection code preferably keeps a table of all registered images in memory, which can be a limiting factor. However, one approach to scaling the system up to millions of images is to use a technique known as sharding. More specifically, each SuperNode (SN) 5 has an identifier used as its name in the Pastel Network environment 1 and, using the concept of XOR distance, each SN can be associated with a particular subset of the space of all previously registered images. These associations would not be disjoint, that is, the same images would be assigned to at least three SNs so that the results of these machines can be compared to see that they all match.

Each SN is responsible for computing the correlations/dependency scores for the candidate image compared to the subset of all registered images which the SN is responsible for. After this is done, these correlation scores are shared with other SNs in the network, and the results from the SNs that have been assigned the same subset of images are compared to check for consistency. The verified results from each group of SNs are all sent to the three top-ranked SuperNodes, which combine the results and then finish the computation (e.g., rareness score, Internet rareness score, and the like). This avoids the limiting factor mentioned above, namely that the full table of registered fingerprints reside in memory at once on a single machine. Additionally, the results of the overall computation from each of the three top-ranked SNs can be compared by all SNs to check for consistency, and if they match, the results can be written to a blockchain.

EXAMPLE EMBODIMENT

What follows is a description of further embodiments of the system for digital asset fingerprinting and rareness evaluation that can be implemented using the processor 100 comprising processing circuits or modules, such as an image processor 145, the Fingerprinting Engine (FE) 150, the Relative Rareness Engine (RRE) 155, and the Machine Learning Module 160. More specifically, when provided with a candidate digital asset (that has a corresponding visual appearance), the system is configured to detect if the digital asset is a duplicate of another (e.g., earlier encountered) digital asset. The system is further capable of evaluating or authenticating a rareness of a digital asset based on the digital asset's visual appearance in light of a registry of other digital assets (or comparable distinguishing information of the visual appearances, such as digital fingerprints, of those other digital assets). Although the exemplary fingerprinting and rareness evaluation techniques are applied to digital images having an associated visual appearance, the technique can be generalized to other types of digital works. For case of description, the terms digital asset, NFT, visual appearance, input image and digital fingerprint are sometimes used interchangeably, with their actual meaning apparent from context.

The technique begins with generating a digital fingerprint for the digital asset. For example, the digital fingerprint can be generated by the Fingerprinting Engine 150. The digital fingerprint preferably satisfies various properties, including: (1) be relatively simple to express, such as a vector of numbers, each number representing an aspect of the visual appearance of the digital asset; (2) be manageable, such as only enough numbers to characterize the visual appearance; (3) be discriminating, such that different visual appearances have correspondingly different digital fingerprints; and (4) capture similarity, such that the closer in visual appearance, the closer the corresponding digital fingerprints. These and other desired properties often compete, and the vastness of visual appearance similarity and need for computationally-friendly digital fingerprints in order to detect duplicates or establish rareness over potentially millions of other visual appearances lends this problem well to solution by machine learning.

Accordingly, in an example embodiment, deep learning is employed by the FE 150 to generate the fingerprint vector, for example, using the Resnet50 deep learning model. Resnet50 is a convolutional neural network that is 50 layers deep and is configured by training to take an input image and "embeds" image features in a vector, such as a 2048-dimensional vector of values (e.g., floating-point numbers), that characterizes the contents of the image. While this vector embedding of the image can serve as a vector representation of the image, it can require further processing (such as additional learning steps) to acquire the desired properties of a digital fingerprint. In addition, while other embodiments of the FE are described as using multiple different deep learning models (such as four) to process the image and generate respective vectors and the resulting output vectors concatenated into one large vector, the resulting vector can have redundant numbers and embed the image less efficiently. It should be noted that the numbers that make up the vectors are sometimes referred to as dimensions, though these vectors only have one dimension in a mathematical sense, but a vector with N numbers can also be seen as expressing a point in N dimensional space.

As such, in an example embodiment, an additional deep neural net can be used by the FE 150 after the initial (e.g., Resnet50) deep learning network. The additional neural net takes as input the vectors from the initial (e.g., Resnet50) neural net and is trained to transform these vectors into a new vector (e.g., a 2,048-dimensional vector) that is optimized for the specific task of determining image similarity. This can be done using the Machine Learning Module 160 by training a model on a large number (such as a million or millions) of image pairs, where the first element in the pair is an original image, and the second element is a transformed image (e.g., an altered image that still looks visually similar to the original image). Transformations can include various operations such as (but not limited to) cropping, flipping, rotating, adding rectangular overlays (e.g., partial covering), and deleting parts of the image. For example, the image transformations can be performed by the Image Processor 145.

In further detail, the model is trained based on the concept that related images should be mapped (or embedded) by the model to similar vectors, since it is known a-priori that they are simple transformations of each other. This additional learning is impactful, as running the original image and the transformed image (e.g., the same image but with a randomly placed black rectangle that covers up 25% of the original image) through Resnet50 might produce different looking vectors. However, with the additional learning stage, and by forcing related images to be closer together in the embedding space, the model learns to see past superficial changes such as simple transformations and see such transformed images as similar to the original images. As such, the first deep learning model learns to characterize image content into a simple vector of properties, while the second deep learning model is trained to refine or optimize that characterization for determining image similarity by recognizing simple transformations of one image to be similar to one another. This produces far more accuracy with a single vector than is possible with only one deep learning model.

As already mentioned, the output of the second deep learning model can have the same dimensionality, say 2048 dimensions (or numbers), as the first deep learning model output. However, the second deep learning model can produce redundant numbers in the output vectors (e.g., numbers that behave closer to linear combinations of one or more other numbers in the vectors). Thus, in an embodiment, these excess numbers (dimensions) in the output vectors can be removed using dimension-reduction techniques such as principal component analysis (PCA). For example, the PCA (a type of unsupervised machine learning) can be performed by the Machine Learning Module 160 on hundreds of thousands of sample outputs of the second deep learning model. This compression of the numbers to a more mutually orthogonal (linearly independent) set can remove over a quarter of the numbers, resulting in a final "optimized" fingerprint vector of about 1500 numbers (dimensions), for example.

This final vector is discriminative and optimized for the task of measuring image similarity that the answer (NFT similarity) can be determined from these vectors relatively easily. To compare two images (visual appearances), the dot product of the two vectors (also known as cosine similarity) is computed, which measures the extent that the vectors make the same angle with respect to the origin in 1,500-dimensional space. For example, these dot products can be computed by the Relative Rareness Engine 155. This is a simple, fast, and efficient computation to perform once the original images (visual appearances) are reduced to consistent 1500-number digital fingerprints as described above. The result of the dot product is a single number that represents how similar the vectors are; with the higher the number, the more the similarity (and reverse for the lower the dot product).

This result can then be normalized using a normalization technique to produce a number within a specified range (such as −1 to 1, or 0 to 1) or distribution, such as positive values representing a high probability that the two images are near duplicates and negative values representing a high probability that the images are not likely duplicates. For example, this normalization can be performed by the Relative Rareness Engine 155. Further, within the normalized range, the magnitude serves as the degree of similarity, with larger positive values indicating greater certainty of duplication and smaller negative values indicating greater dissimilarity. For ease of description, unless otherwise expressed, normalized ranges will be assumed to be from 0 to 1 (inclusive).

The above-described technique produces 1500-number digital fingerprint vector with little correlation between the numbers across a diverse set of visual appearances. Accordingly, as a first step of determining the rareness of a digital asset with respect to a set (or registry) of known or registered visual appearances, the corresponding digital fingerprint for each of the registered digital assets can be computed and stored in a registry by the FE 150. The digital fingerprint of the digital asset's visual appearance is then computed using the same technique by the Fingerprinting Engine 150. Then the corresponding dot products of the digital fingerprint of the digital asset with the registered digital fingerprints are computed and normalized (e.g., by the Relative Rareness Engine 155). These are efficient computations that can be performed over even a large registry (millions of visual appearances, or more precisely their digital fingerprints).

In an embodiment, RRE 155 is configured to use the foregoing dot products to winnow down the vast set of registered digital fingerprints to a small number N (say 10) possible digital fingerprints that are most similar (in other words, have the highest likelihood of being a near-duplicate of the candidate digital fingerprint).

Assuming N=10 for ease of discussion, the above technique efficiently identifies the 10 closest (or most similar) registered visual appearances to that of the digital asset whose rareness is being ascertained. The 10 digital fingerprints selected are from a database of potentially millions of candidate fingerprints. However, the subtle differences between two similar visual appearances, especially trying to decide if they are duplicates or to measure the degree of similarity, can be difficult to ascertain from a single digital fingerprint (and corresponding dot product or normalized dot product). Accordingly, RRE can be configured to implement additional comparison techniques. Specifically, the RRE can apply additional measures of statistical dependency to compare the candidate digital fingerprint to each of the top-10 most similar registered image fingerprints.

In an embodiment, the additional measures of statistical dependency comprise a population measurement test of deviation from independence, such as, for example, Hoeffding's Dependence measure, or Hoeffding's D, and Hilbert-Schmidt Independence Criteria, or HSIC. For example, these additional measures of statistical dependency can be computed by the Relative Rareness Engine 155. These measures are more computationally intensive than cosine similarity (e.g., simple dot products of the digital fingerprints), but provide more nuanced measurements of just how related the two digital fingerprints being compared are to each other. These two additional measures of similarity (e.g., dependence, independence, or rareness) help reduce the chance of a spurious match by chance with cosine similarity, which can be a significant risk when the database of registered images contains millions of image fingerprints, and can lead to a lot of spurious false positive matches. Accordingly, in an embodiment, one or both of Hoeffding's D and HSIC are used to specifically measure similarity of a candidate fingerprint to existing fingerprints that exhibit high cosine similarity to the candidate fingerprint.

The use of one or both of these specific measures of similarity to further refine the most similar matches generated via cosine similarity significantly reduces the frequency of false positive matches. Because Hoeffding's D and HSIC are computationally intensive, it would not be practical to apply them to all of the registered image fingerprints because that would not scale to millions of registered fingerprints. By first winnowing the list of possible matches down to 10, it becomes tractable to use these additional measures. While Hoeffding's D and HSIC are specifically listed as additional measures of statistical dependency, any additional measure of statistical dependency that is capable of reducing false positive matches from cosine similarity (or other simple measures, such as Pearson correlation) can be used to supplement the cosine similarity, especially when working on large databases (e.g., millions) of registered digital fingerprints. Again, N=10 for ease of description, but N can be other values in other embodiments, such as 8 or 12.

In another embodiment, in addition to these three measures of statistical dependency (normalized cosine similarity, Hoeffding's D, and HSIC), the RRE 155 can be configured to evaluate the "gain" of these measures for multiple digital fingerprints to further evaluate similarity. More specifically, Cosine similarity can be used to establish a ranking of similarity between the top ten 10 most similar registered digital fingerprints and the candidate digital fingerprint whose rareness is being determined. The RRE can also compute additional statistical dependency measures (Hoeffding's D, and HSIC) for a plurality of consecutively-ranked digital fingerprints and the measures compared to determine the "gains" of those measures. Put another way, the gains quantify how much the different measures of statistical dependency vary with respect to their cosine similarity rank. As will be described further, these gains/differential values can be used to better evaluate how similar the top 10 matches are to the candidate digital fingerprint (and to some extent, each other). This allows a more informed choice to be made about whether one of the top is a duplicate as well as to determine how rare (or different) the candidate digital fingerprint (and thus corresponding digital asset) is within the database of registered digital fingerprints (and corresponding visual appearances or images).

In further detail, and by way of example, consider the top 10 registered fingerprints as measured by cosine similarity with respect to the candidate digital asset's digital fingerprint (or candidate digital fingerprint). These 10 digital fingerprints can be sorted 1st, 2nd, down to 10th by their respective cosine similarities to the candidate digital fingerprint. The RRE can further calculate the other two measures (Hoeffding's D and HSIC) of statistical dependency with respect to the candidate digital fingerprint for a plurality of the most similar fingerprints, say, the $1^{st}$ ranked most similar fingerprint and $2^{nd}$ ranked most similar fingerprint. Then differentials (differences, gains) between the respective measures of consecutively ranked digital fingerprints can then be determined.

For example, suppose the 3 scores for the top-1 most similar fingerprint are (Normalized cosine similarity: 0.25; Hoeffding's D: 0.15; HSIC: 0.09). Now suppose that the 3 scores for the second most similar fingerprint (the top-2 fingerprint) are (Normalized cosine similarity: 0.21; Hoeffding's D: 0.09; HSIC: 0.07). The "gain" scores can be calculated as the % by which the top-1 scores exceed the top-2 scores, namely:

Normalized cosine similarity gain:0.25/0.21−1=~0.190;

Hoeffding's $D$ gain:0.15/0.09−1=~0.666;

HSIC gain:0.09/0.06−1=0.5.

This can likewise be done for the 2nd and 3rd digital fingerprints, the 3rd and 4th digital fingerprints, and down the top 10 ranked digital fingerprints. This gain can be generalized to all of the top-10 results, by comparing the Nth most similar fingerprint to the (N−1)th most similar fingerprint (which requires the top-11 fingerprint be scored).

It should be noted that the differential, difference, or gain can be expressed in alternative forms. For example, the gains can be absolute differences, or percentage increases of the higher-ranked digital fingerprint over the lower-ranked digital fingerprint.

In summary, the gains measure the extent to which the statistical dependency of the registered fingerprints to the candidate image fingerprint varies as the ordinal rank of the similarity of the registered fingerprint changes. Again, this measure provides additional insight into how similar the candidate digital fingerprint is to the registered digital fingerprints. For example, if there are several similar registered fingerprints to the candidate image fingerprint, but the 1st ranked digital fingerprint has large gains with respect to the 2nd ranked digital fingerprint, then that constitutes additional evidence that the 1st fingerprint is somehow special and more likely a duplicate, while the 2nd, 3rd, and other similar registered digital fingerprints are merely visually similar but do not rise to the level of a duplicate.

In an example embodiment, the plurality of measures of statistical dependency along with their corresponding gains between consecutively ranked registered fingerprints (a total of six numerical inputs in the example configuration of three measures and three gains) are determined for each of the top 10 registered digital fingerprints. These six numerical scores can then be input to a machine learning statistical model. This last model can use a logistic regression that processes the six input numbers and produces a single numerical output, namely a number between 0.0 and 1.0, which represents the probability that the candidate image is a duplicate of the particular registered image. For example, this statistical model can be trained on the Machine Learning Module 160. This machine learning model is trained by taking a large corpus of images and generating near-duplicate transformed images that exhibit high degrees of transformation that make them challenging to detect.

For example, in one embodiment, 100,000 images from various sources, such as public fine art image data sets like Wikiart, are selected. From these, tens of thousands of complex near duplicate images are generated by an automated process using a variety of complex transformations. This is described further with reference to FIGS. 10A-10C.

Figure 10A:
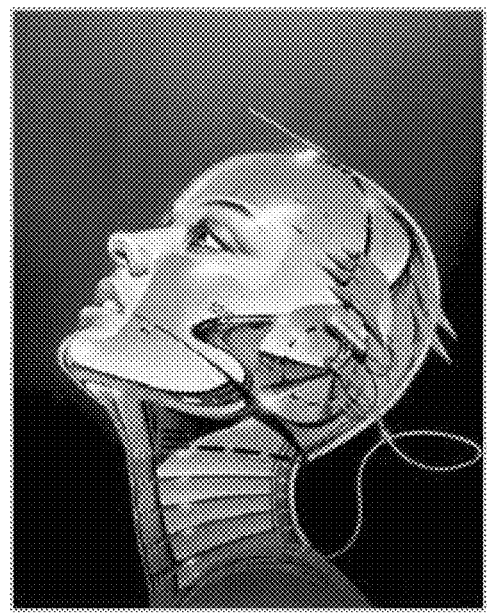
FIGS. 10A-10C illustrate original and transformed art images for training machine learning techniques for authentication of rareness of a digital asset, according to an embodiment.
Figure 10B:
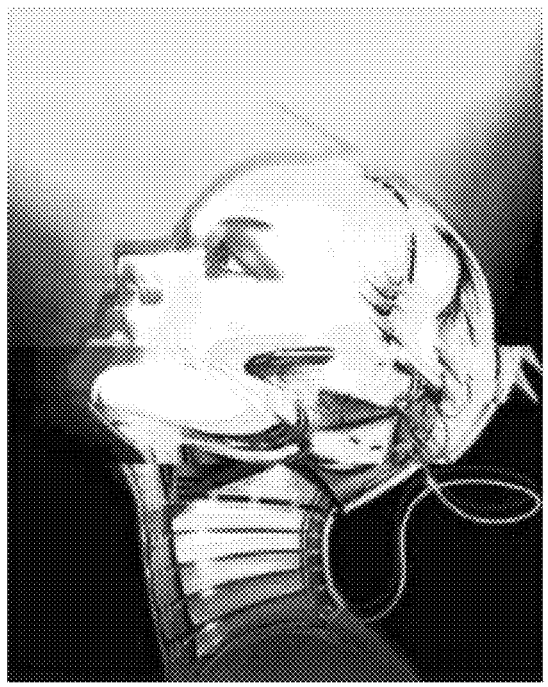
Figure 10C:
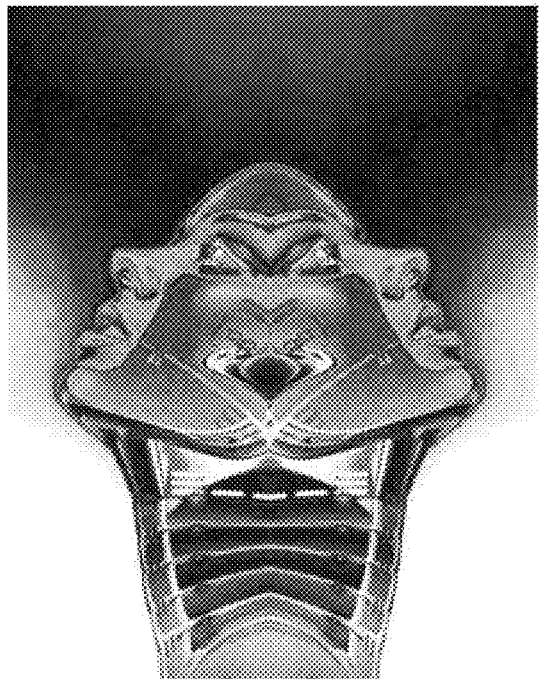

FIGS. 10A-10C illustrate original and transformed art images for training machine learning techniques (such as the logistic regression model) for authentication of rareness of a digital asset, according to an embodiment. FIGS. 10A-10C illustrate some examples of complex transformations. FIG. 10A illustrates an original art image, while FIGS. 10B-10C illustrate two different complex transformations of the original art image in FIG. 10A. While a human observer could likely look at FIGS. 10B-10C and tell quickly that they are transformed copies of FIG. 10A, such a determination is more challenging for a computer algorithm to make. This is because nearly every pixel has been changed, and there are complex structural changes that profoundly impact the overall patterns in the transformed images.

In a more specific embodiment, the training images are broken down into three general categories: (1) registered original images (such as 80,000 of the 100,000 original images); (2) generated duplicates of the registered original images (such as 50,000 images based on some of the 80,000 images in the first category); and (3) true original images (such as the remaining 20,000 of the 100,000 original images). The registered original images form the registry of protected visual appearances (already seen and registered), while the generated duplicates are used for testing for false negatives (i.e., duplicates determined to be originals) as well as incorrect positives (i.e., duplicates determined to be duplicates, but based off the incorrect registered original image). In addition, the true originals are used for testing for false positives (i.e., originals determined to be duplicates).

In addition to the training data, the logistic regression model is trained using a loss function that generates a single number to measure how well the model is working. In one embodiment, the Area Under the Precision Recall Curve (AUC-PR or AUPRC) is used. AUPRC is a model performance metric intended for binary responses such as rare events (e.g., duplicate detection). For example, the AUPRC can be calculated by the Machine Learning Module 160 as part of the training of the logistic regression model. Here, the logistic regression model learns to work with the six input statistics for the top 10 cosine similarity registered fingerprints, and produces a single registered fingerprint whose probability of being a duplicate is the highest of any of the other top fingerprints. When this probability is above a threshold probability (such as 50% or 75%), the logistic regression model determines that a duplicate has been found, and outputs a 1 for the highest registered fingerprint and a 0 for all other registered fingerprints. When this probability is below the threshold probability, the logistic regression model determines that no duplicate has been found, and outputs a 0 for all the registered fingerprints.

The logistic regression model is trained by randomly selecting images from the generated duplicates and the true (unregistered) originals, producing their digital fingerprints and corresponding measures of statistical dependency (and their gains) with the registered images, and running the logistic regression model on the measures and gains for the top 10 registered fingerprints. The generated duplicates are run through the system to detect false negatives and incorrect positives while the true originals are run through the system to detect false positives. Ideally, there are none of these (i.e., the logistic regression model is perfect), but in reality, it is a tradeoff between precision (accuracy in terms of minimizing false positives—saying something is a duplicate when it is a true original—and minimizing incorrect positives—saying something is a duplicate of one registered image when it is a duplicate of another registered image) and recall (coverage in terms of minimizing the number of false negatives-saying something is a true original when it is really a duplicate). The precision and recall depend on the cutoff threshold probability chosen. The AUPRC metric captures in a single number both recall and precision across all possible thresholds, making it an ideal measure.

In an embodiment, AUPRC is used as the loss function to train the logistic regression, finding the coefficients that best optimize AUPRC given the six numerical inputs for each of the top ten registered fingerprints. That is, AUPRC can determine optimal coefficients (or weights) for each of the three measures and their gains. The six coefficients (weights) from an example AUPRC are 11.023235 (cosine measure), 247.833809 (Hoeffding's D measure), −154.621053 (HSIC measure), 26.973047 (cosine gain), −254.253315 (Hoeffding's gain), and 132.568845 (HSIC gain).

In summary, in an example embodiment, all six of the measures and differentials/gains for each of the top 10 registered fingerprints are input to a logistic regression, which outputs a value representing the probability of a duplicate. For example, the probability determination can be performed by the Relative Rareness Engine 155 running the trained logistic regression model. In addition, in one such embodiment, AUPRC is used as the specific loss function for training the logistic regression, which provides the best overall balance between the twin concerns of catching as many duplicates as possible while minimizing false positive accusations of true originals.

In an example technique of authenticating rareness of a digital asset (or more precisely its visual appearance or image) with respect to a registered set of visual appearances or images, a rareness score from 0 to 1 is returned, with 0 being no rarity (i.e., a duplicate of one of the registered images) and 1 being complete rarity (dissimilar to all the registered images). Put another way, rareness defines a measure of novelty to some specified corpus of previously registered images, as opposed to being identical to or a simple transformation or two off from one of the registered images. Accordingly, in some embodiments, rareness is defined to be one minus the highest duplicate probability of any previously registered image. For example, the rareness calculation can be performed by the Relative Rareness Engine 155. For instance, if the above technique is followed for a candidate image against a registry of known images, the top 10 closest registered images are identified. Of these, the most likely duplicate image is chosen and the probability of the candidate image being a duplicate of the chosen image determined (such as 0.7 or 70%). Finally, the rareness is computed by subtracting this from 1, (such as 1−0.7=0.3 or 30%).

To recap, the rareness score is 1.0 minus the maximum duplicate probability of any previously registered image. As such, if no already registered images are similar to the candidate image, then none of these will have a high probability of being a duplicate, and thus the rareness score of the candidate image will be high. Conversely, if a registered image has a high duplicate probability with one or more of the registered images, then the candidate image rareness score will be close to zero. Accordingly, the rareness score measures the novelty or scarcity of an image or images for the purposes of quantifying the potential value of a digital image good (such as an NFT or other digital asset.

Figure 11:
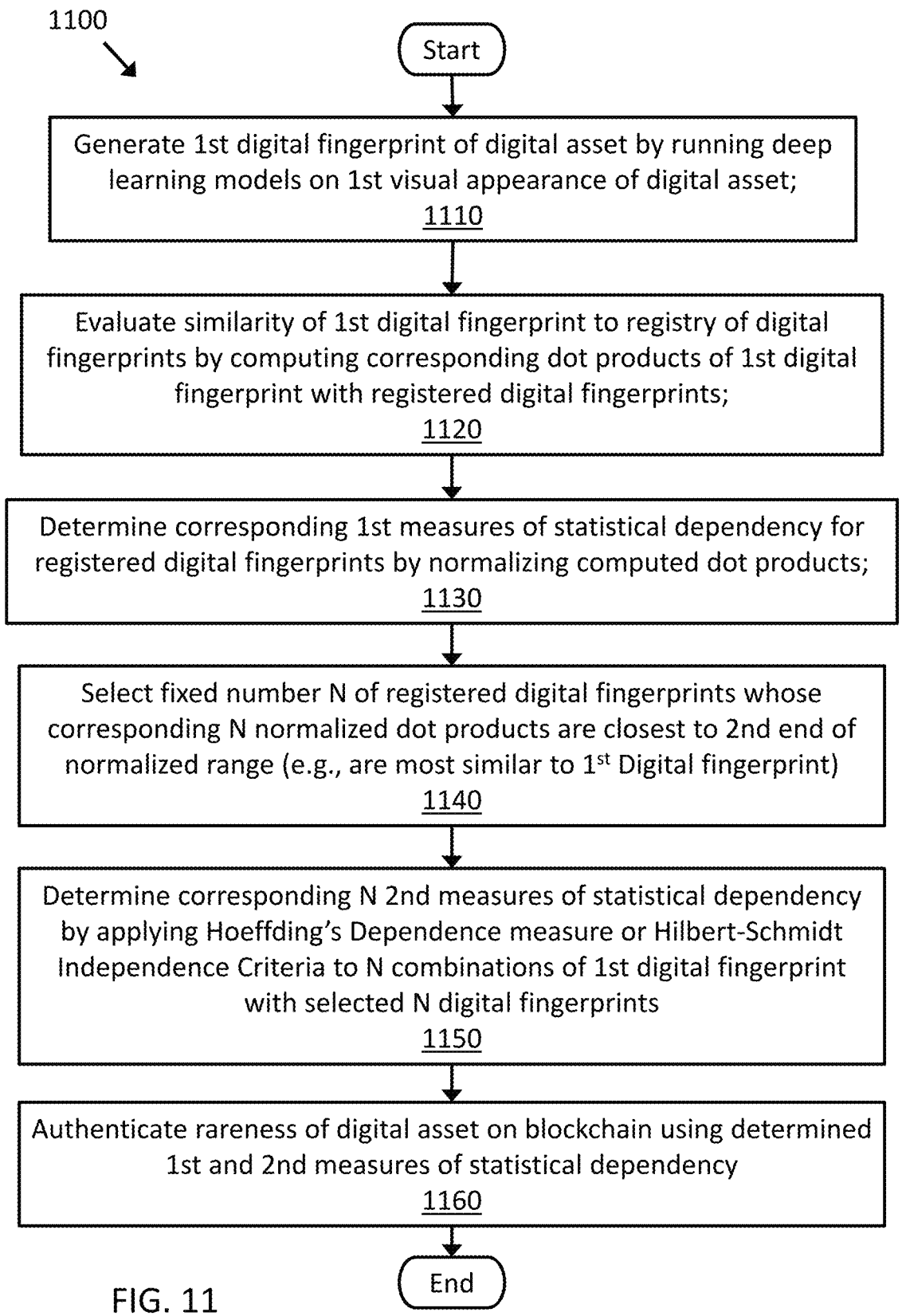
FIG. 11 is a flow diagram of an example automated method for authentication of rareness of a digital asset, according to an embodiment.

FIG. 11 is a flow diagram of an example automated method 1100 for authentication of rareness of a digital asset, according to an embodiment. The method 1100 is automated under the control of an electronic circuit (such as a microprocessor), which is configured (e.g., by code, such as programmed, by custom logic, as in configurable logic gates, or the like) to carry out the steps of the method 1100.

Some or all of the method 1100 can be performed using components and techniques illustrated in FIGS. 1A-10C. In addition, portions of this and other methods or processes disclosed herein can be performed on or using simulation logic, such as custom or preprogrammed control logic devices, circuits, or processors, as in a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause portions of the method 1100 (or other disclosed method or process) to be carried out. It should be noted that in other embodiments, the order of the operations can be varied, and that some of the operations can be omitted. Some of the method 1100 can also be performed using logic, circuits, or processors located on or in electrical communication with a processing circuit configured by code to carry out these portions of the method 1100.

In the method 1100 processing begins with the step of generating 1110 (such as by the Fingerprinting Engine 150) a first digital fingerprint of the digital asset by running deep learning models on a first visual appearance (such as a digital artwork) of the digital asset. The generated first digital fingerprint is a first vector of between 1000 and 2000 numbers (such as 1500 numbers) for determining visual appearance similarity (such as 1500 numerical values that quantify aspects of the visual appearance that make it appear similar to other visual appearances). The deep learning models are trained (such as by the Machine Learning Module 160) on at least 100,000 (such as a million) visual appearances in order to generate corresponding first vectors for determining visual appearance similarity.

The method 1100 further includes the step of evaluating 1120 (such as by the Relative Rareness Engine 155) similarity of the first digital fingerprint to a registry of digital fingerprints by computing corresponding dot products (such as for cosine similarity) of the first digital fingerprint with the registered digital fingerprints. Here, the registry of digital fingerprints functions as a database of registered images, where rareness of a digital asset is based on how dissimilar its visual appearance is from other such visual appearances, as measured by their corresponding digital fingerprints. Large dot products indicate strong similarly while small dot products indicate weak similarity. The registry of digital fingerprints is obtained by identifying visual appearances (such as building a database of visual appearances) for establishing rarity, and then running the deep learning models on the identified visual appearances in order to generate the corresponding digital fingerprints.

In addition, the method 1100 includes the step of determining 1130 (such as by the Relative Rareness Engine 155) corresponding first measures of statistical dependency for the registered digital fingerprints by normalizing the computed dot products. The normalized dot products take on a range (such as from 0 to 1, or from −1 to 1) having a first end (such as 0 or −1) corresponding to no similarity with the first visual appearance and a second end (such as 1) corresponding to identical similarity with the first visual appearance. The method 1100 also includes the step of selecting 1140 (such as by the Relative Rareness Engine 155) a fixed number N (such as ten) of the registered digital fingerprints whose corresponding N normalized dot products are closest to the second end of the normalized range (such as the 10 digital fingerprints whose corresponding visual appearances are most similar to that of the digital asset).

Further, the method 1100 includes the step of determining 1150 (such as by the Relative Rareness Engine 155) a corresponding N second measures of statistical dependency by applying Hoeffding's Dependence measure (Hoeffding's D) or Hilbert-Schmidt Independence Criteria (HSIC) to N combinations of the first digital fingerprint with the selected N digital fingerprints. These are more highly computational measures of dependence (similarity), and can be used to further distinguish the most similar digital fingerprints. Finally, the method 1100 includes the step of authenticating 1160 (such as by the Relative Rareness Engine 155) the rareness of the digital asset using the determined first and second measures of statistical dependency (such as adding them together, assuming they are normalized to the same, equivalent, or compatible ranges).

In an embodiment, running the deep learning models on the first visual appearance includes running a first deep learning model (such as a Resnet50 deep learning model) on the first visual appearance to produce a second vector of between 2000 and 4000 numbers (such as 2048 numbers)

that characterize the first visual appearance. The first deep learning model is trained (such as by the Machine Learning Module 160) on at least 100,000 visual appearances (such as a million visual appearances) to produce corresponding second vectors that characterize the visual appearances. Running the deep learning models further includes running a second deep learning model (such as an additional deep neural net) on the produced second vector to generate a third vector of similar size (such as a 2048 numbers) to the second vector and optimized for determining visual appearance similarity.

In further detail, the second deep learning model is trained (such as by the Machine Learning Module 160) on at least a million second vector pairs. Each pair of second vectors is produced by running the first deep learning model on a corresponding original visual appearance and a transformed visual appearance obtained (such as by the Image Processor 145) by applying one of a plurality of transformations to the original visual appearance. In addition, the second deep learning model forces the pair of produced second vectors to be closer together in an embedding space in order to generate corresponding third vectors optimized for determining visual appearance similarity. Running the deep learning models further includes compressing the generated third vector to the first vector by eliminating redundant information, such as by using principal component analysis (PCA), in order to generate the first digital fingerprint. In one such embodiment, for each original visual appearance and corresponding transformed visual appearance, applying one of the transformations includes performing one of cropping the original visual appearance, flipping the original visual appearance, rotating the original visual appearance, adding one or more rectangular overlays to the original visual appearance, and deleting one or more parts from the original visual appearance.

In an embodiment, the step of determining 1150 the corresponding N second measures of statistical dependency includes applying Hoeffding's D to the N digital fingerprint combinations. The method 1100 further includes the step of determining a corresponding N third measures of statistical dependency by applying HSIC to the N digital fingerprint combinations. In addition, the step of authenticating 1160 the rareness of the digital asset includes further using the determined third measures of statistical dependency.

In a further embodiment of this, the method 1100 further includes the steps of: ranking the N digital fingerprints based on their corresponding first measures of statistical dependency (such as cosine similarity); computing differentials/gains (such as differences) of the first measures of statistical dependency between consecutively ranked digital fingerprints; computing differentials/gains of the second measures of statistical dependency between the consecutively ranked digital fingerprints; and computing differentials/gains of the third measures of statistical dependency between the consecutively ranked digital fingerprints. In addition, the step of authenticating 1160 the rareness of the digital asset includes further using the computed differentials/gains of the first, second, and third measures of statistical dependency.

In a further embodiment of this, the step of authenticating 1160 the rareness of the digital asset includes running a machine learning model that uses logistic regression to, for each digital fingerprint of the N digital fingerprints, process the measures of statistical dependency and differentials/gains measured for the digital fingerprint and produce a single output representing a probability that the corresponding visual appearance of the digital fingerprint is a duplicate of the first visual appearance. Here, the six inputs include the first, second, and third measures of statistical dependency of the digital fingerprint and the differentials of the first, second, and third measures of statistical dependency of the digital fingerprint.

In a further embodiment, the logistic regression model is trained (such as by the Machine Learning Module 160) on tens of thousands of visual appearances and their corresponding digital fingerprints and six-input and single output combinations, as well as on tens of thousands of complex transformations of the visual appearances and their corresponding digital fingerprints and six-input and single output combinations.

In a further embodiment of this, the logistic regression model is further trained (such as by the Machine Learning Module 160) using the Area Under the Precision Recall Curve (AUPRC) as a loss function to measure how well the model is working.

In a further embodiment of the logistic regression model, the method 1100 further includes the steps of determining a second fingerprint of the N digital fingerprints that has a highest probability of being a duplicate of the first digital fingerprint from among the output probabilities of the logistic regression model; and determining a rareness score of the digital asset by subtracting the output highest probability from one. Here, the step of authenticating 1160 the rareness of the digital asset includes further using the determined rareness score.

Any of the methods described herein may, in corresponding embodiments, be reduced to a non-transitory computer readable medium (CRM) having computer instructions stored therein that, when executed by a processing circuit, cause the processing circuit to carry out an automated process for performing the respective methods.

The methods described herein may be performed in whole or in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

Returning now to FIG. 1B, FIG. 1B is a conceptual block diagram illustrating a non-limiting embodiment of the processor 100 that can be included in the server 10 (shown in FIG. 1A) of a SuperNode 5. As seen in FIG. 1B, the processor 100 can include a computer processor 110 such as a central processing unit (CPU), a read-only memory (ROM) 115, a random-access memory (RAM) 120, a disk drive (DD) 125, a network interface 130, an input/output (I/O) interface 135, and a database (DB) 170. Although Database 170 is shown in FIG. 1B as being part of the processor in FIG. 1B, database 170 is not intended to be so limited and can include one or more databases external to the processor 100, as shown in FIG. 1A. The various components in the processor 110 can be connected to a bus 105 via one or more communication links. The processor 100 can receive or otherwise access NFT data for processing via, for example, the network interface 130, I/O interface 135, DD 125, or the DB 170.

The system bus 105 can be any of several types of bus structures that can further interconnect to a memory bus (with or without a memory controller), a peripheral bus, and a local bus using any of a variety of commercially available bus architectures.

The CPU 110 can be any of various commercially available processors. Dual microprocessors and other multi-processor architectures can also be employed as the CPU 110. The CPU 110 can also be a graphics processing unit (GPU).

The processor 100 includes a computer-readable medium that can hold executable or interpretable computer code (or instructions) that, when executed by the CPU 110, cause the described steps, processes, and methods to be carried out. The computer-readable medium can be provided in the ROM 115, RAM 120, DD 125, DB 170, or an external computer-readable medium connected to the processor 100 via the network interface 130 or the I/O interface 135. The computer readable medium can include functional modules, for instance, sections of computer code that, when executed by the CPU 110 cause the steps of workflows to be carried out, and all other process steps described or contemplated in the description.

A basic input/output system (BIOS) can be stored in a non-volatile memory in the processor 100, such as, for example, the ROM 115. The ROM 115 can include a ROM, an erasable programmable read-only memory (EPROM), or an electrically erasable programmable read-only memory (EEPROM). The BIOS can contain the basic routines that help to transfer information between components within the processor 100, such as during start-up. The RAM 120 can include a high-speed RAM such as static RAM for caching data.

The disk drive (DD) 125 can include a hard drive, such as, for example, an enhanced integrated drive electronics (EIDE) drive, or a serial advanced technology attachments (SATA) drive. The DD 125 can include an optical disk drive that can read/write from/to a compact disk read-only memory (CD-ROM) disk (not shown), or read from or write to other high capacity optical media such as a digital video disk (DVD). The DD 125 can be configured for external use in a suitable chassis (not shown). The DD 125 can be connected to the system bus 105 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 125 and associated computer-readable media can provide nonvolatile storage of data, data structures, or computer-executable instructions. The DD 125 can accommodate the storage of any data in a suitable digital format. The DD 125 can include one or more apps that are used to execute aspects of the architecture described in this specification.

A number of program modules can be stored in the DD 125, ROM 115, or RAM 120, including an operating system (not shown), one or more application programs (not shown), other program modules (not shown), and program data (not shown). Any (or all) of the operating system, application programs, program modules, and program data can be cached in the RAM 120 as executable sections of computer code.

The network interface 130 can communicatively connect the processor to a communications network. The network interface 130 can include a wired or a wireless communication network interface (not shown) or a modem (not shown). When used in a data communications network, the processor 100 can be connected to the LAN network through the wired or wireless communication network interface; and, when used in a wide area network (WAN), the processor 100 can be connected to the WAN network through the modem. The modem (not shown) can be internal or external and wired or wireless. The modem can be connected to the system bus 105 via, for example, a serial port interface (not shown).

The I/O interface 135 can receive commands and data from an operator via a user interface device (not shown), such as, for example, a keyboard (not shown), a mouse (not shown), a pointer (not shown), a microphone (not shown), a speaker (not shown), or a display (not shown). The received commands and data can be forward to the CPU 110 from the I/O interface 135 as instruction and data signals via the bus 105.

The image processor 145 can include an image processing device, graphics driver (not shown), a video adaptor (not shown), or any other device necessary to process, generate and render an image signal on a display device, such as, for example a display device of the I/O interface 135 or the display device in a communicating device connected thereto.

As further shown in FIG. 1B and discussed above, the processor 100 can include the Fingerprinting Engine 150, Relative Rareness Engine 155, and Machine Learning Module 160. It should be understood that one or more of the Fingerprinting Engine, Relative Rareness Engine and Machine Learning Module, and other such hardware and/or software-based components shown in FIG. 1B can be integrated with the CPU 110 or provided separately, as seen in FIG. 1B. Furthermore, such modules can be in the form of instructions stored on one of the computer readable storage mediums and executable in the CPU. It should be further understood that one or more of the hardware and/or software-based components shown in FIG. 1B can be integrated with the processor or provided separately/externally from the processor.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals or radio frequency signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, Wi-Fi, WiMAX, IEEE 802.11, DECT, 0G, 1G, 2G, 3G or 4G cellular standards, or Bluetooth.

The terms "computer," "computing device," or "processor," as used in this disclosure, means any machine, device, circuit, component, or module, or any system of machines, devices, circuits, components, or modules that are capable of manipulating data according to one or more instructions. The terms "computer." "computing device" or "processor" can include, for example, without limitation, a communicating device, a computer resource, a processor, a microprocessor (µP), a microcontroller (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, Wi-Fi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including." "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An automated method for authentication of rareness of a digital asset, the method comprising:
    generating a first digital fingerprint of the digital asset by running one or more deep learning models on a first visual appearance of the digital asset, the generated first digital fingerprint being a first vector representing the first visual appearance, the one or more deep learning models being trained to process visual appearances of digital assets and generate corresponding first vectors suitable for determining visual appearance similarity;
    evaluating similarity of the first digital fingerprint to a registry of registered digital fingerprints by computing corresponding dot products of the first digital fingerprint with the registered digital fingerprints, the registry of registered digital fingerprints being obtained by running the one or more deep learning models on corresponding visual appearances of registered digital assets;
    determining corresponding first measures of statistical dependency for the registered digital fingerprints by normalizing the computed dot products to a range having a first end corresponding to no similarity with the first visual appearance and a second end corresponding to identical similarity with the first visual appearance;
    selecting a fixed number N of the registered digital fingerprints whose corresponding N normalized dot products are closest to the second end of the normalized range;
    determining a corresponding N second measures of statistical dependency by applying a population measurement test of deviation from independence to N combinations of the first digital fingerprint with the selected N digital fingerprints; and
    authenticating the rareness of the digital asset using the determined first and second measures of statistical dependency.

2. The method of claim 1, wherein running the one or more deep learning models on the first visual appearance comprises:
    running a first deep learning model on the first visual appearance to produce a second vector comprising a plurality of values that characterize the first visual appearance, the first deep learning model being trained on a plurality of visual appearances to produce corresponding second vectors that respectively characterize the visual appearances;
    running a second deep learning model on the produced second vector to generate a third vector optimized for determining visual appearance similarity, the second deep learning model being trained on second vector pairs, each pair of second vectors being produced by running the first deep learning model on a corresponding original visual appearance and a transformed visual appearance obtained by applying one of a plurality of transformations to the original visual appearance, and forcing the pair of produced second vectors to be closer together in an embedding space in order to generate corresponding third vectors optimized for determining visual appearance similarity; and
    compressing the generated third vector to the first vector by eliminating redundant information in order to generate the first digital fingerprint.

3. The method of claim 2, wherein the first deep learning model is a convolutional neural network.

4. The method of claim 2, wherein for each original visual appearance and corresponding transformed visual appearance, applying one of the transformations comprises performing one of cropping the original visual appearance, flipping the original visual appearance, rotating the original visual appearance, adding one or more rectangular overlays to the original visual appearance, and deleting one or more parts from the original visual appearance.

5. The method of claim 2, wherein eliminating the redundant information comprises using principal component analysis (PCA).

6. The method of claim 1, wherein the population measurement test of deviation from independence is selected from the group consisting of Hoeffding's Dependence measure (Hoeffding's D) and Hilbert-Schmidt Independence Criteria (HSIC).

7. The method of claim 1, wherein
    determining the corresponding N second measures of statistical dependency comprises applying a first population measurement test of deviation from independence to the N digital fingerprint combinations,
    the method further comprises determining a corresponding N third measures of statistical dependency by applying a second population measurement test of deviation from independence to the N digital fingerprint combinations, and
    authenticating the rareness of the digital asset is performed using the determined third measures of statistical dependency.

8. The method of claim 7, further comprising:
    ranking the N digital fingerprints based on their corresponding first measures of statistical dependency;
    computing differentials of the first measures of statistical dependency between consecutively ranked digital fingerprints;
    computing differentials of the second measures of statistical dependency between the consecutively ranked digital fingerprints; and computing differentials of the third measures of statistical dependency between the consecutively ranked digital fingerprints, wherein authenticating the rareness of the digital asset is performed using the computed differentials of the first, second, and third measures of statistical dependency.

9. The method of claim 8, wherein authenticating the rareness of the digital asset comprises running a machine learning model that uses logistic regression to, for each digital fingerprint of the N digital fingerprints, process a plurality of inputs of the digital fingerprint and produce a single output representing a probability that the corresponding visual appearance of the digital fingerprint is a duplicate of the first visual appearance, the plurality of inputs comprising the first, second, and third measures of statistical dependency of the digital fingerprint and the differentials of the first, second, and third measures of statistical dependency of the digital fingerprint.

10. The method of claim 9, wherein the logistic regression model is trained on tens of thousands of visual appearances and their corresponding digital fingerprints and six-input and single output combinations, as well as on tens of thousands of complex transformations of the visual appearances and their corresponding digital fingerprints and six-input and single output combinations.

11. The method of claim 10, wherein the logistic regression model is further trained using a model performance metric for binary responses as a loss function to measure how well the logistic model is working.

12. The method of claim 9, further comprising:
determining a second fingerprint of the N digital fingerprints that has a highest probability of being a duplicate of the first digital fingerprint from among the output probabilities of the logistic regression model; and
determining a rareness score of the digital asset by subtracting the output highest probability from one,
wherein authenticating the rareness of the digital asset is based on the rareness score.

13. An automated system for authentication of rareness of a digital asset, the system comprising:
a processing circuit;
a non-transitory storage medium storing a registry of registered digital fingerprints, machine learning models, and instructions that, when executed by the processing circuit, configure the processing circuit to:
generate a first digital fingerprint of the digital asset by running one or more deep learning models of the stored machine learning models on a first visual appearance of the digital asset, the generated first digital fingerprint being a first vector representing the first visual appearance, the deep learning models being trained to process visual appearances of digital assets and generate corresponding first vectors suitable for determining visual appearance similarity;
evaluate similarity of the first digital fingerprint to the registered digital fingerprints in the registry by computing corresponding dot products of the first digital fingerprint with the registered digital fingerprints, the registry of registered digital fingerprints being obtained by running the deep learning models on corresponding visual appearances of registered digital assets;
determine corresponding first measures of statistical dependency for the registered digital fingerprints by normalizing the computed dot products to a range having a first end corresponding to no similarity with the first visual appearance and a second end corresponding to identical similarity with the first visual appearance;
select a fixed number N of the registered digital fingerprints whose corresponding N normalized dot products are closest to the second end of the normalized range;
determine a corresponding N second measures of statistical dependency by applying a population measurement test of deviation from independence to N combinations of the first digital fingerprint with the selected N digital fingerprints; and
authenticate the rareness of the digital asset using the determined first and second measures of statistical dependency.

14. The system of claim 13, wherein the instructions, when executed by the processing circuit, further cause the processing circuit to run the deep learning models on the first visual appearance by:
running a first deep learning model on the first visual appearance to produce a second vector of values that characterize the first visual appearance, the first deep learning model being trained on a plurality of visual appearances to produce corresponding second vectors that characterize the visual appearances;
running a second deep learning model on the produced second vector to generate a third vector of similar size to the second vector and optimized for determining visual appearance similarity, the second deep learning model being trained second vector pairs, each pair of second vectors being produced by running the first deep learning model on a corresponding original visual appearance and a transformed visual appearance obtained by applying one of a plurality of transformations to the original visual appearance, and forcing the pair of produced second vectors to be closer together in an embedding space in order to generate corresponding third vectors optimized for determining visual appearance similarity; and
compressing the generated third vector to the first vector by eliminating redundant information in order to generate the first digital fingerprint.

15. The system of claim 14, wherein for each original visual appearance and corresponding transformed visual appearance, applying one of the transformations comprises performing one of cropping the original visual appearance, flipping the original visual appearance, rotating the original visual appearance, adding one or more rectangular overlays to the original visual appearance, and deleting one or more parts from the original visual appearance.

16. The system of claim 13, wherein
determining the corresponding N second measures of statistical dependency comprises applying a first population measurement test of deviation from independence to the N digital fingerprint combinations,
the instructions, when executed by the processing circuit, further cause the processing circuit to determine a corresponding N third measures of statistical dependency by applying a second population measurement test of deviation from independence to the N digital fingerprint combinations, and
the rareness of the digital asset is authenticated using the determined third measures of statistical dependency.

17. The system of claim 16, wherein the instructions, when executed by the processing circuit, further cause the processing circuit to:

rank the N digital fingerprints based on their corresponding first measures of statistical dependency;
compute differentials of the first measures of statistical dependency between consecutively ranked digital fingerprints;
compute differentials of the second measures of statistical dependency between the consecutively ranked digital fingerprints; and
compute differentials of the third measures of statistical dependency between the consecutively ranked digital fingerprints,
wherein the rareness of the digital asset is authenticated using the computed differentials of the first, second, and third measures of statistical dependency.

18. The system of claim 17, wherein authenticating the rareness of the digital asset comprises running an other machine learning model of the stored machine learning models, the other machine learning model using logistic regression to, for each digital fingerprint of the N digital fingerprints, process a plurality of inputs of the digital fingerprint and produce a single output representing a probability that the corresponding visual appearance of the digital fingerprint is a duplicate of the first visual appearance, the plurality of inputs comprising the first, second, and third measures of statistical dependency of the digital fingerprint and the differentials of the first, second, and third measures of statistical dependency of the digital fingerprint.

19. The system of claim 18, wherein the logistic regression model is trained on tens of thousands of visual appearances and their corresponding digital fingerprints and six-input and single output combinations, as well as on tens of thousands of complex transformations of the visual appearances and their corresponding digital fingerprints and six-input and single output combinations.

20. The system of claim 18, wherein the instructions, when executed by the processing circuit, further cause the processing circuit to:
determine a second fingerprint of the N digital fingerprints that has a highest probability of being a duplicate of the first digital fingerprint from among the output probabilities of the logistic regression model; and
determine a rareness score of the digital asset by subtracting the output highest probability from one,
wherein the rareness of the digital asset is authenticated using the rareness score.

21. A non-transitory computer readable medium (CRM) having computer instructions stored therein that, when executed by a processing circuit, cause the processing circuit to carry out an automated process for authentication of rareness of a digital asset, the process comprising:
generating a first digital fingerprint of the digital asset by running one or more deep learning models on a first visual appearance of the digital asset, the generated first digital fingerprint being a first vector of values representing the first visual appearance, the one or more deep learning models being trained process visual appearances of digital assets and to generate corresponding first vectors suitable for determining visual appearance similarity;
evaluating similarity of the first digital fingerprint to a registry of registered digital fingerprints by computing corresponding dot products of the first digital fingerprint with the registered digital fingerprints, the registry of registered digital fingerprints being obtained by running the deep learning models on corresponding visual appearances of the registered digital assets;
determining corresponding first measures of statistical dependency for the registered digital fingerprints by normalizing the computed dot products to a range having a first end corresponding to no similarity with the first visual appearance and a second end corresponding to identical similarity with the first visual appearance;
selecting a fixed number N of the registered digital fingerprints whose corresponding N normalized dot products are closest to the second end of the normalized range;
determining a corresponding N second measures of statistical dependency by applying a population measurement test of deviation from independence to N combinations of the first digital fingerprint with the selected N digital fingerprints; and
authenticating the rareness of the digital asset using the determined first and second measures of statistical dependency.

22. The CRM of claim 21, wherein running the deep learning models on the first visual appearance comprises:
running a first deep learning model on the first visual appearance to produce a second vector comprising a plurality of values that characterize the first visual appearance, the first deep learning model being trained on a plurality of visual appearances to produce corresponding second vectors that characterize the visual appearances;
running a second deep learning model on the produced second vector to generate a third vector optimized for determining visual appearance similarity, the second deep learning model being trained on second vector pairs, each pair of second vectors being produced by running the first deep learning model on a corresponding original visual appearance and a transformed visual appearance obtained by applying one of a plurality of transformations to the original visual appearance, and forcing the pair of produced second vectors to be closer together in an embedding space in order to generate corresponding third vectors optimized for determining visual appearance similarity; and
compressing the generated third vector to the first vector by eliminating redundant information in order to generate the first digital fingerprint.

23. The CRM of claim 22, wherein for each original visual appearance and corresponding transformed visual appearance, applying one of the transformations comprises performing one of cropping the original visual appearance, flipping the original visual appearance, rotating the original visual appearance, adding one or more rectangular overlays to the original visual appearance, and deleting one or more parts from the original visual appearance.

24. The CRM of claim 21, wherein
determining the corresponding N second measures of statistical dependency comprises applying a first population measurement test of deviation from independence to the N digital fingerprint combinations,
the process further comprises determining a corresponding N third measures of statistical dependency by applying a second population measurement test of deviation from independence to the N digital fingerprint combinations, and
authenticating the rareness of the digital asset comprises further using the determined third measures of statistical dependency.

25. The CRM of claim 24, wherein the process further comprises:

ranking the N digital fingerprints based on their corresponding first measures of statistical dependency;
computing differentials of the first measures of statistical dependency between consecutively ranked digital fingerprints;
computing differentials of the second measures of statistical dependency between the consecutively ranked digital fingerprints; and
computing differentials of the third measures of statistical dependency between the consecutively ranked digital fingerprints,
wherein authenticating the rareness of the digital asset comprises further using the computed differentials of the first, second, and third measures of statistical dependency.

26. The CRM of claim 25, wherein authenticating the rareness of the digital asset comprises running a machine learning model that uses logistic regression to, for each digital fingerprint of the N digital fingerprints, process a plurality of inputs of the digital fingerprint and produce a single output representing a probability that the corresponding visual appearance of the digital fingerprint is a duplicate of the first visual appearance, the plurality of inputs comprising the first, second, and third measures of statistical dependency of the digital fingerprint and the differentials of the first, second, and third measures of statistical dependency of the digital fingerprint.

27. The CRM of claim 26, wherein the logistic regression model is trained on tens of thousands of visual appearances and their corresponding digital fingerprints and six-input and single output combinations, as well as on tens of thousands of complex transformations of the visual appearances and their corresponding digital fingerprints and six-input and single output combinations.

28. The CRM of claim 26, wherein the process further comprises:
  determining a second fingerprint of the N digital fingerprints that has a highest probability of being a duplicate of the first digital fingerprint from among the output probabilities of the logistic regression model; and
  determining a rareness score of the digital asset by subtracting the output highest probability from one,
  wherein authenticating the rareness of the digital asset comprises further using the rareness score.

* * * * *